United States Patent [19]

Matovich

[11] 4,199,545
[45] Apr. 22, 1980

[54] FLUID-WALL REACTOR FOR HIGH TEMPERATURE CHEMICAL REACTION PROCESSES

[75] Inventor: Edwin Matovich, Brea, Calif.

[73] Assignee: Thagard Technology Company, Irvine, Calif.

[21] Appl. No.: 792,858

[22] Filed: May 2, 1977

Related U.S. Application Data

[63] Continuation of Ser. No. 606,222, Aug. 20, 1975, abandoned, which is a continuation-in-part of Ser. No. 271,560, Jul. 13, 1972, Pat. No. 3,933,434.

[51] Int. Cl.² .............................................. B01J 1/00
[52] U.S. Cl. ........................................ 422/112; 13/32;
219/549; 250/527; 422/109; 422/129; 422/150;
422/198; 422/199; 422/240; 422/241;
423/447.2
[58] Field of Search ................... 23/252 R, 277, 284;
423/447.1, 447.2; 250/527; 13/31, 32, 20;
219/405; 422/240, 242, 199, 150, 129, 112

[56] References Cited

U.S. PATENT DOCUMENTS

| 1,810,172 | 6/1931 | Hayes ................................ 13/1 X |
|---|---|---|
| 2,021,991 | 11/1935 | Depew ............................ 23/277 R |
| 2,166,225 | 7/1939 | Twining ....................... 23/277 R X |
| 2,436,282 | 2/1948 | Bennett ............................ 23/277 R |
| 2,743,307 | 4/1956 | Johnson ................................. 13/31 |
| 3,257,492 | 6/1966 | Westeren ................................ 13/31 |
| 3,367,812 | 2/1968 | Watts .......................... 423/447.2 X |
| 3,607,073 | 9/1971 | Stamm ............................ 23/230 R |
| 3,933,434 | 1/1976 | Matovich ........................ 23/252 R |

*Primary Examiner*—Arnold Turk
*Attorney, Agent, or Firm*—Pennie & Edmonds

[57] ABSTRACT

A fluid-wall reactor for high temperature chemical reactions is described, the reactor comprising (A) a porous reactor tube, at least a portion of the interior of which defines a reaction zone, the tube being made of a fabric of a fibrous refractory material; (B) a pressure vessel enclosing the reactor tube to define an inert fluid plenum, the pressure vessel having at least one inlet for admitting the inert fluid which is directed under pressure through the porous tube wall to provide a protective blanket for the inside surface of the reactor tube; (C) means for introducing at least one reactant into the reaction zone, the reactants being directed in a predetermined path axially of the reactor tube and being confined by the protective blanket substantially centrally within the reaction zone; (D) means disposed within the plenum for heating the reactor tube to the temperature level at which it emits sufficient radiant energy to initiate and sustain the desired chemical reaction, the radiant energy being directed into the reaction zone to coincide with at least a portion of the path of the reactants; and (E) a heat shield disposed within the pressure vessel, substantially enclosing the heating means and the reaction zone to define a black body cavity, the heat shield reflecting radiant energy toward the reaction zone.

The fluid-wall reactor of the invention may be used in virtually any high temperature chemical reaction, many of which reactions have been previously regarded as impractical or only theoretically possible. Among the reactions which may be carried out in the fluid-wall reactor of the invention as the dissociation of hydrocarbons and hydrocarbonaceous materials, such as coal and various petroleum fractions, into hydrogen and carbon black; the steam reforming of coal, petroleum fractions, oil shale, tar sands, lignite, and any carbonaceous or hydrocarbonaceous feedstock into synthesis gas mixtures; the partial dissociation of hydrocarbons and hydrocarbonaceous materials into lower molecular weight compounds; the partial pyrolysis of saturated hydrocarbons into unsaturated hydrocarbons, such as ethylene, propylene and acetylene; the conversion of organic waste materials, such as sewage sludge, into a fuel gas; the complete or partial desulfurization of sulfur-containing hydrocarbonaceous feedstocks; and the reduction of mineral ores with hydrogen, carbon, synthesis gas, or other reducing agent.

37 Claims, 17 Drawing Figures

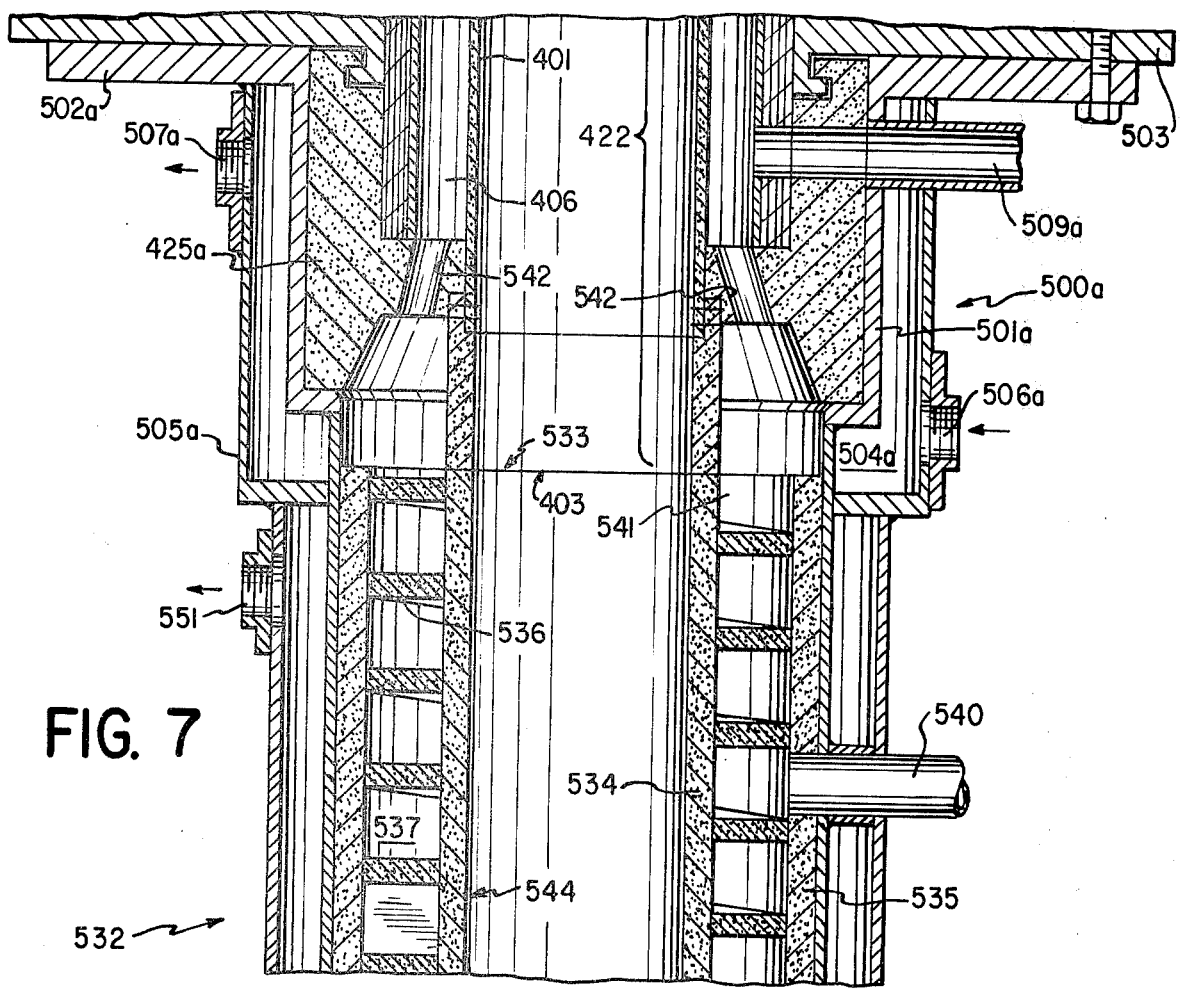
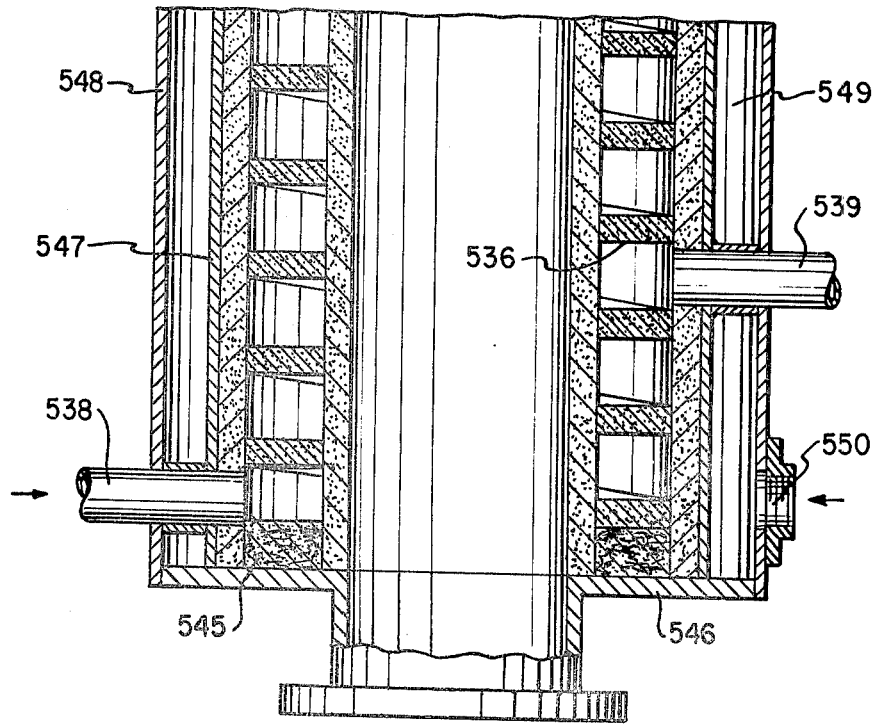
FIG. 7

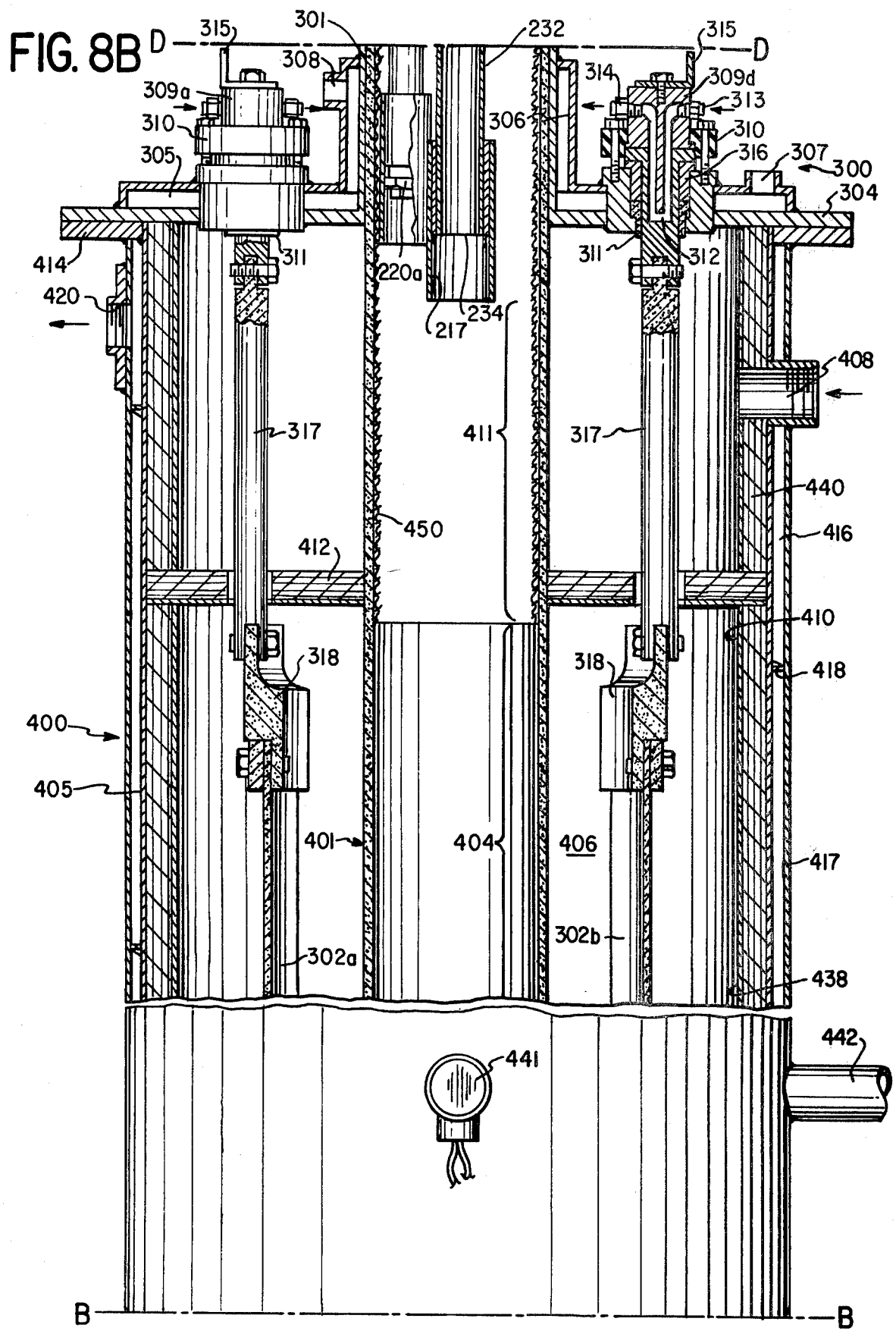

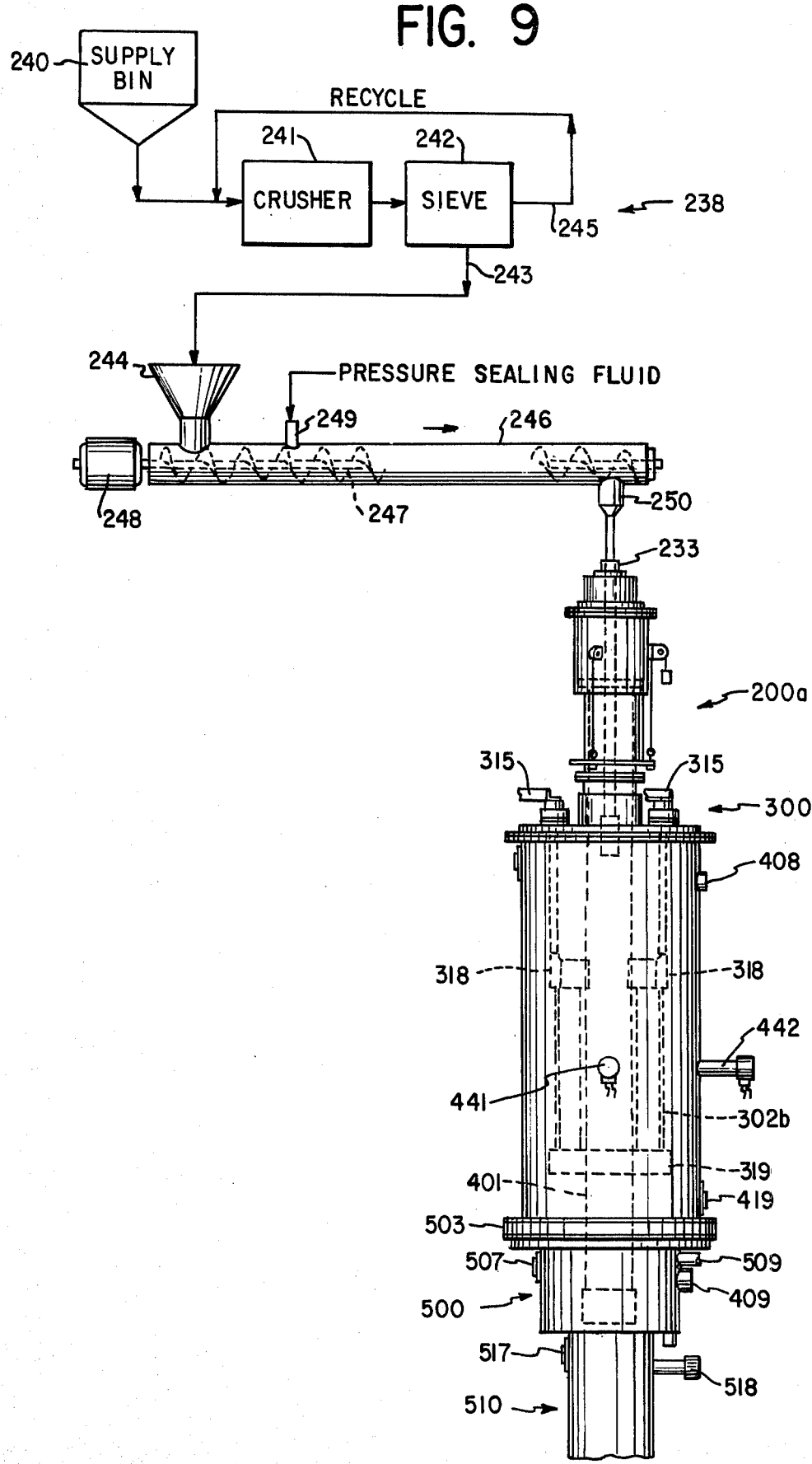

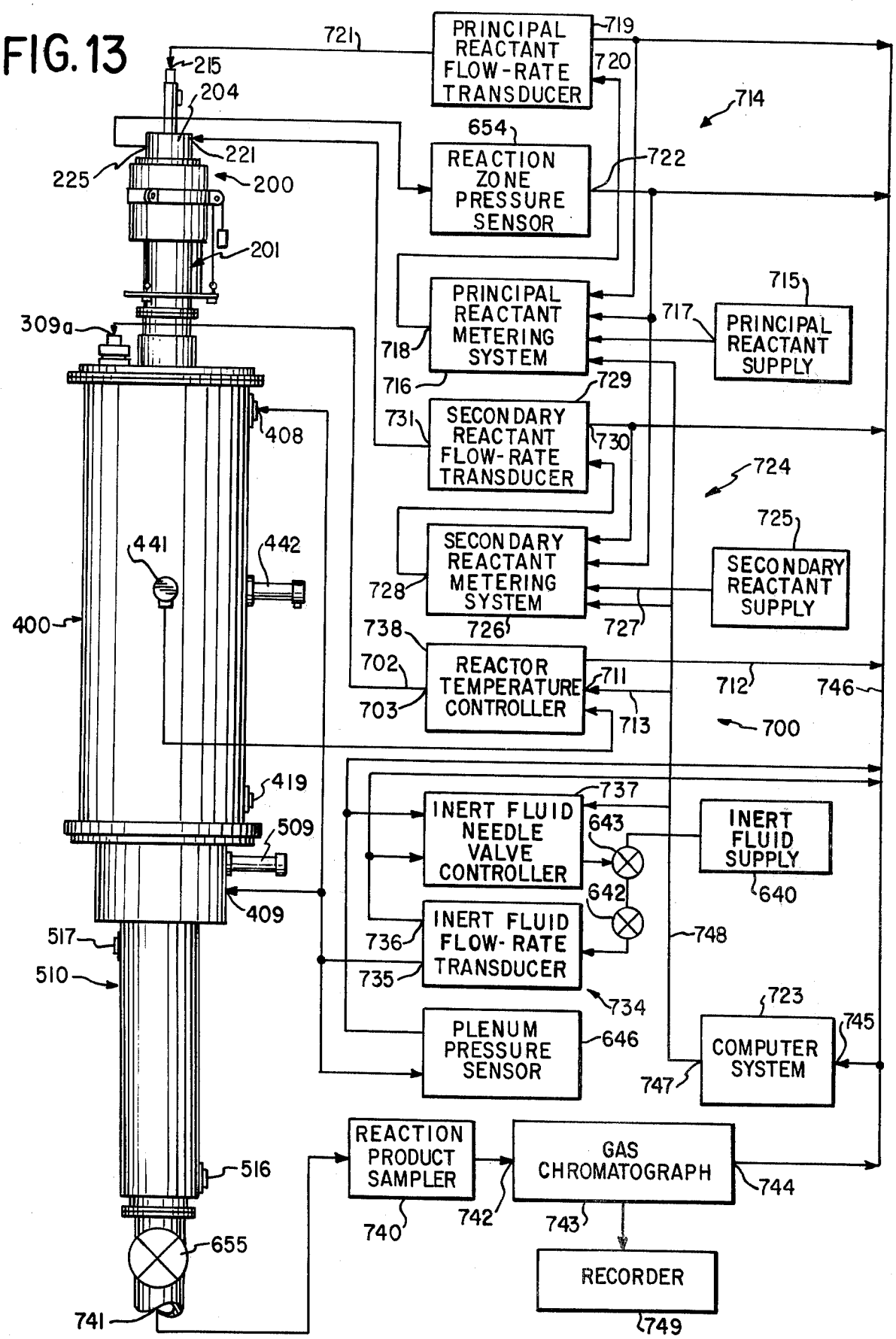

FLUID-WALL REACTOR FOR HIGH TEMPERATURE CHEMICAL REACTION PROCESSES

CROSS-REFERENCE TO RELATED APPLICATION

This application is a continuation of application Ser. No. 606,222, filed Aug. 20, 1975 and now abandoned, which in turn was a continuation-in-part of application Ser. No. 271,560, filed July 13, 1972 and now U.S. Pat. No. 3,933,434.

BACKGROUND OF THE INVENTION

The present invention relates generally to a fluid-wall reactor for the carrying out of many high temperature chemical reactions which previously have been regarded as impractical or only theoretically possible. The present reactor utilizes radiation coupling as a heat source, maintains the contemplated chemical reactions in isolation within a protective fluid blanket or envelope out of contact with the containing surfaces of the reactor, and provides a heat shield which substantially encloses the radiant energy heating means and the reaction zone to define a "black body cavity". As used herein, the term "black body cavity" is generally intended to denote a space which is substantially enclosed by a surface or surfaces and from which, ideally, no radiation can escape. Within the context of the present fluid-wall reactor, the heat shield constitutes the enclosing surface or surfaces of the "black body cavity" and the material from which the heat shield is fabricated (1) functions as an insulator, inhibiting the transfer of heat from within the "black body cavity", and (2) must be able to withstand the temperatures generated by the radiation coupling heat source.

High temperature reactors are presently employed to carry out pyrolysis, thermolysis, disassociation, decomposition and combustion reactions of both organic and inorganic compounds. Substantially all such reactors transfer heat to the reactants by convection and/or conduction, but this characteristic inherently produces two major problems which limit the nature and scope of the reactions which may be carried out. Both problems result from the fact that in a conventional reactor which transfers heat to the reactants by convection, the highest temperature in the system is necessarily at the interface between the inside wall of the reactor and the reactant stream.

The first problem involves the limitations on available temperatures of reaction which are imposed by the strength at elevated temperatures of known reactor wall materials. The decreasing capability of such materials to maintain their integrity under conditions of increasing temperature is, of course, well known. However, since it is necessary that such materials be heated in order that thermal energy may be transferred to the reactant stream, available reaction temperatures have been limited by the temperature to which the reactor wall could be safely heated. This factor is particularly critical in cases where the contemplated reaction either must take place at or produces high pressures.

The second problem inherently results both because the wall of a conventional reactor is at the highest temperature in the system and because convective/conductive heat transfer requires contact between the wall and the reactant stream. Being at such elevated temperature, the reactor wall is an ideal if not the most desirable reaction site in the system and, in many instances, reaction products will accumulate and build up on the wall. Such build-up impairs the ability of the system to transfer heat to the reactants and this ever increasing thermal impedance requires the source temperature to be raised progressively just to maintain the initial rate of heat transfer into the reactant stream. Obviously, as the build-up increases, the required source temperature will eventually exceed the capabilities of the reactor wall material. Moreover, as additional energy is required to sustain the reaction, the process becomes less efficient in both the technical and economic sense. Thus, at the point where the contemplated reaction can no longer be sustained on the basis of either heat transfer, strength of materials, or economic considerations, the system must be shut down and cleaned.

Usually, cleaning is performed mechanically by scraping the reactor wall or chemically by burning off the deposits. In some continuous processes, it has been attempted to scrape the reactor wall while the reaction proceeds. However, the scraping tool itself necessarily gets hot, becomes a reaction site and, thereafter, must be cleaned. In any event, this down time represents a substantial economic loss. In many instances, a second system will be installed in order to minimize lost production time. However, such additional equipment generally represents a substantial capital investment. Some high temperature chemical reactors include a tube which is heated to a temperature at which its inner walls emit sufficient radiant energy to initiate and sustain the reaction. However, as in the case of conductive and convective reactors, for reactions yielding solid products there is frequently an undesirable build-up of product on the tube walls which leads to reduced heat transfer and even clogging of the tube.

The apparatus for the manufacture of carbon black disclosed in U.S. Pat. No. 2,062,358 includes a porous tube disposed within a heating chamber. Hot gas is directed from a remote furnace into the chamber, and thereafter forced through the wall of the porous tube to mix with the reactants. Thus, only convective transfer of heat from a fluid to reactants is employed. This, together with the absence of a "black body cavity", necessitates the flow of a large volume of fluid through the heating chamber in order to make up for heat losses.

U.S. Pat. No. 2,769,772 discloses a reactor for heat-treating fluid materials such as hydrocarbons which includes two concentric tubes disposed in a flame heated furnace. Reactants flow axially through the pervious inner concentric tube. A heat-carrier gas flowing in the annular chamber between the concentric tubes is heated by contact with the outer wall. Fluids in the inner tube are heated by convection when the heat-carrier gas passes through the pervious wall and mixes with them. Radiant heat transfer is expressly avoided. In fact, it is impossible to heat the inner tube without simultaneously heating the outer tube to at least as high a temperature.

The surface-combustion cracking furnace of U.S. Pat. No. 2,436,282 employs the convective heat carrier gas principle similar to that of U.S. Pat. No. 2,769,772. The furnace includes a porous, refractory tube enclosed by a jacket. A combustible fluid from an annular chamber is forced through the porous wall to the inside of the tube where it is ignited. It is evident, however, that the combustible fluid in the annular chamber will explode unless it is forced through porous wall at a rate faster than the rate of flame propagation back through the wall. Likewise, the temperature in the annular chamber must be maintained below the ignition temperature of the gas/air mixture. Combustion products from the surface flame mix with reactants in the furnace diluting and possibly reacting with them. Heat is imparted to the reactants by convective mixing of the combustion products and the reactants.

U.S. Pat. Nos. 2,670,272; 2,670,275; 2,750,260; 2,915,367; 2,957,753; and 3,499,730 disclose combustion chambers for producing pigment-grade titanium dioxide by burning titanium tetrachloride in oxygen. In the '275 patent, which is representative of this group of references, titanium tetrachloride is burned in a porous, refractory tube. An inert gas is continuously diffused through the porous tube into a combustion chamber where it forms a protective blanket on the inner surface of tube. This gaseous blanket substantially reduces the tendency of the titanium dioxide particles to adhere to the walls of the reactor. Since the combustion of titanium tetrachloride is an exothermic reaction, no provision is made to supply heat to the reaction mixture as it passes through tube. In fact, the '275 patent teaches that it is advantageous to remove heat from reactor chamber either by exposing the porous tube assembly to the atmosphere or by circulating a cooling fluid through a coil disposed about the porous tube.

SUMMARY OF THE INVENTION

The fluid-wall reactor of the present invention transfers substantially all of the required heat to the reactants by radiation coupling. The reactor comprises a tube having an inlet end and an outlet end, at least a portion of the interior of the tube defining a reaction zone; the reactor tube is made of a fabric of a fibrous refractory material capable of emitting sufficient radiant energy to raise the temperature of reactants within the reaction zone to a level required to initiate the sustain the desired chemical reaction. The fabric has a multiplicity of pores of such diameter as to permit a uniform flow of sufficient inert fluid which is substantially transparent to radiant energy through the tube wall to constitute a protective blanket for the radially inward surface of the reactor tube. A fluid-tight, tubular pressure vessel encloses the reactor tube to define an inert fluid plenum between the reactor tube and the pressure vessel, the inlet and outlet ends of the reactor tube being sealed from the plenum. The pressure vessel has at least one inlet for admitting the inert fluid which is directed under pressure into the plenum and through the porous tube wall into the reaction zone. The reactor further includes means for introducing at least one reactant into the reaction zone through the inlet end of the reactor tube. Thereafter, the reactants are directed in a predetermined path axially of the reactor tube and are confined by the protective blanket substantially centrally within the reaction zone and out of contact with the inner wall of the reactor tube. At least one electrical heating element is disposed within the plenum and spaced radially outwardly of the reactor tube for heating the reactor tube to the temperature level at which it emits sufficent radiant energy to initiate and sustain the desired chemical reaction. The radiant energy is directed into the reaction zone substantially coincident with at least a portion of the path of the reactants. A heat shield is disposed within the pressure vessel substantially enclosing the heating elements and the reaction zone to define a black body cavity. The heat shield reflects radiant energy inwardly toward the reaction zone.

In contrast to the conventional convective reactors, the present invention relies upon radiation coupling to transfer heat to the reactant stream. The amount of heat transferred is independent both of physical contact between the reactor wall and the stream and of the degree of turbulent mixing in the stream. The primary consideration for heat transfer in the present system is the radiation absorption coefficient ($\alpha$) of the reactants. The inert fluid blanket which protects the reactor wall is desirably substantially transparent to radiation and thus exhibits a very low value of ($\alpha$). This enables radiant energy to be transferred through the blanket to the reactant stream with little or no energy losses. Ideally, either the reactants themselves or a target medium will exhibit high ($\alpha$) values and will thus absorb large amounts of energy, or alternatively, the reactants may be finely divided (as in a fog) such that the radiation is absorbed by being trapped between the particles. Since materials which are good absorbers are generally good emitters of radiation, when the reactants or targets are raised to a sufficiently high temperature, they become secondary radiators which re-radiate energy throughout the entire reacting volume and further enhance the heat transfer characteristics of the system. This occurs almost instantaneously and is subject to precise and rapid control. Moreover, the reradiation phenomenon which ensures rapid and uniform heating of the reactants is completely independent of the degree of turbulent mixing which may exist in the reactant stream.

The present fluid-wall reactor for high temperature chemical reactor process provides a solution to problems which have plagued industry. Because heat is supplied by radiation coupling rather than by convection and/or conduction, the temperature of the reactant stream may be independent of both pressure vessel wall and of the condition of the reactant stream, and the serious strength of materials problem is overcome. Although it provides a heated wall as a source of radiant energy, the reactor tube of the present invention is not subjected to the high pressures which are normally attendant to many kinds of reactions. For this reason, refractory materials which are not suitable for use as a wall material in a conventional reactor may be successfully employed. This feature permits reaction temperatures far in excess of these presently achievable and reactions which had been only theoretically feasible may be carried out.

Carbon cloth, the preferred refractory material for the present reactor tube, is relatively inexpensive, readily available, and may be formed into reactor tubes substantially larger than those of cast porous carbon presently available. Since carbon cloth is normally flexible, any attempt to force an inert gas radially inwardly through a reactor tube of such material would ordinarily cause the tube to collapse. Accordingly, the present invention contemplates the depositing of a layer of pyrolytic graphic on the cloth to stiffen it sufficiently to withstand the pressure differential maintained between the inert fluid plenum and the reaction zone. Depositing a layer of pyrolytic graphite on the cloth also permits control of the porosity of the fabric.

The provision of the protective inert fluid blanket, which is made possible largely by the use of radiation coupling, isolates the reactor wall from the reactor stream and makes it impossible under normal operating conditions for any precipitates or other deposits to accumulate and clog the system. In the event a corrosive blanket fluid such as steam is to be used, surfaces of the reactor tube, heating elements and heat shield which are maintained at high temperatures and in contact with the blanket gas when the reactor is in operation may be coated with a thin layer of refractory oxide such as thorium oxide, magnesium oxide, or zirconium oxide. The refractory oxide may be deposited on these surfaces by heating the reactor to above the dissociation temperature of a volatile metal-containing compound, introducing this compound into the reactor chamber and allowing it to dissociate, depositing a layer of metal on the heated surfaces. Thereafter, a gas or other suitable material (such as molecular oxygen) may be introduced into the reactor chamber to oxidize the metal layer, forming the desired refractory oxide. Alternatively, the refractory coating may be achieved in a single step if a volatile metal-containing compound which pyrolyzes directly to an oxide is employed as a refractory deposition agent.

The use of radiation coupling further enables the accurate and almost instantaneous control of heat transfer rates which is impossible to achieve in a conventional convective reactor. And, the use of a heat shield to provide the containing surface or surfaces of a black body cavity within which all reactions take place, enables the achievement of unusually favorable thermal efficiencies.

The present invention makes available for the first time on a large scale a source of thermal energy which has never been harnessed in this manner.

BRIEF DESCRIPTION OF THE DRAWINGS

FIG. 7 is an elevation in section of a post-reaction treatment assembly of an alternate embodiment of the reactor of the present invention;

FIGS. 8A and 8B together constitute a composite elevation in partial section of an inlet assembly of an alternate embodiment of the present invention; the integral structure of the inlet assembly has been divided along line D—D in order to provide an illustration of sufficient size to show clearly certain structural details.

FIG. 9 is an elevation/schematic view of a reactor of the present invention in combination with apparatus for pre-processing and introducing solid reactants into an inlet assembly of the reactor of the present invention;

FIG. 13 is a schematic representation illustrating the operation of the several control systems of the reactor of the present invention.

DESCRIPTION OF THE PREFERRED EMBODIMENTS

Figure 1A:
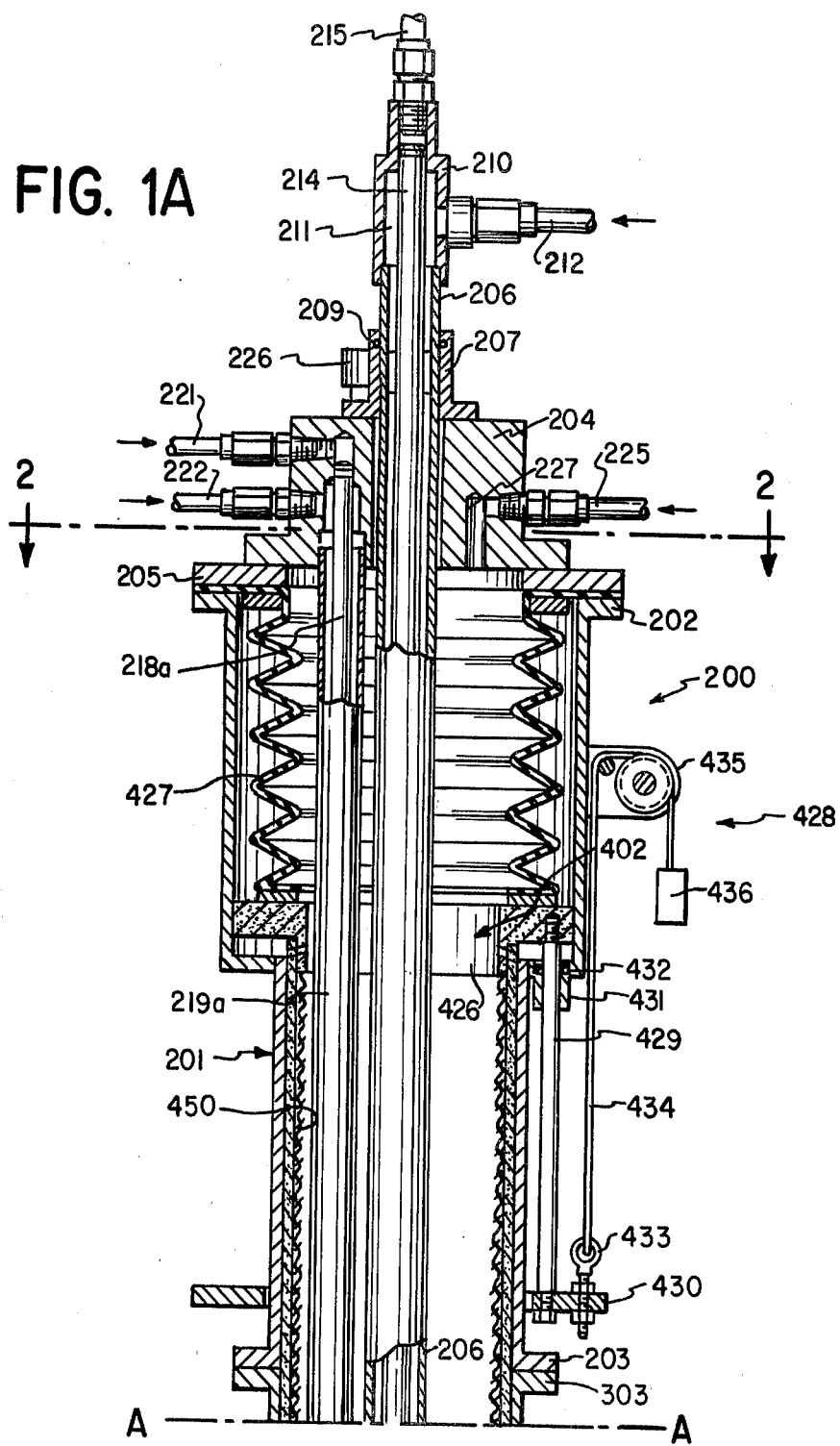
FIGS. 1A, 1B, 1C, and 1D together constitute a composite elevation in partial section of the reactor of the present invention; the integral structure of the reactor has been divided along lines A—A, B—B and C—C, respectively, in order to provide an illustration of sufficient size to show clearly certain structural details.

Referring to FIGS. 1A through 9, inclusive, the present high temperature chemical reactor generally comprises an inlet assembly 200 and electrode assembly 300, a main assembly 400, and a post-reaction treatment assembly 500. The principal elements of the present reactor include:

(A) A reactor tube 401 which has an inlet end 402 and an outlet end 403; at least a portion of the interior of the tube 401 defining a reaction zone 404. The reactor tube 401 is made of a fabric of a fibrous refractory material capable of emitting sufficient radiant energy to raise the temperature of reactants within the reaction zone 404 to a level required to initiate and sustain the desired chemical reaction. The fabric has a multiplicity of pores of such diameter as to permit a uniform flow of sufficient inert fluid which is substantially transparent to radiant energy through the tube wall to constitute a protective blanket for the radially inward surface of the reactor tube 401. As used herein, the terms "radiant energy" and "radiation" are intended to encompass all forms of radiation including high-energy or impacting nuclear particles. However, because the practical use of such radiation is not possible under the present state of the art, black body or other electromagnetic radiation, particularly of wavelengths ranging from about 100 microns to 0.01 microns, is considered to be the primary energy source upon which design considerations are to be based. Similarly, as used herein, the term "inert fluid" is intended to denote a gas, liquid or vapor which has a low coefficient of absorption ($\alpha$), and, as such, is substantially transparent to radiation. Fluids which are suitable for this purpose include simple gases such as helium, neon, argon, krypton and xenon; complex gases which do not decompose to form a solid product such as hydrogen, nitrogen, oxygen and ammonia; and, liquid or gaseous water. The term "inert", as used herein, involves two factors: the ability of the fluid to react chemically with the material of the reactor tube 401 and the ability of the fluid to react chemically with the materials which are being processed. Thus, the selection of an "inert" blanket fluid depends in each instance upon the particular environment. Except as otherwise specifically provided, it is desirable that the fluid be inert with respect to the reactor tube and it is usually desirable that the fluid be inert with respect to the particular reaction being carried out. However, it is contemplated that in some instances the "inert" fluid of the protective blanket shall also participate in the reaction as, for example, where iron or carbon particles are reacted in the presence of a steam blanket to produce iron oxide and hydrogen or carbon monoxide and hydrogen, respectively.

(B) A fluid-tight, tubular pressure vessel (which has an inlet assembly section 201, an electrode assembly section 301, a main assembly section 405, and a post-reaction treatment assembly section 501) encloses the reactor tube 401 to define an inert fluid plenum 406 between the reactor tube 401 and the pressure vessel. The inlet and outlet ends, 402 and 403, respectively, of the reactor tube 401 are sealed from the plenum 406. The pressure vessel has a first inlet 408 and a second inlet 409 for admitting the inert fluid which is directed under pressure into the plenum 406 and through the porous tube wall 401 into the reaction zone 404.

(C) Means for introducing reactants, either gaseous, liquid, or solid, into the reaction zone 404 through the inlet end 402 of the reactor tube 401. The reactants are directed in a predetermined path axially of the reactor tube 401 and are confined by the protective blanket substantially centrally within the reaction zone 404 and out of contact with the inner wall of the reactor tube 401.

(D) Electrical means including heating elements 302a, 302b, and 302c which are disposed within the plenum 406 and spaced radially outwardly of the reactor tube 401 for heating the reactor tube to the temperature level at which it emits sufficient radiant energy to initiate and sustain the desired chemical reaction. The radiant energy is directed into the reaction zone 404 substantially coincident with at least a portion of the path of the reactants.

(E) A heat shield 410 which is disposed within the pressure vessel substantially enclosing the heating elements 302a, 302b, and 302c and the reaction zone 404 to define a black body cavity. The heat shield 410 reflects radiant energy inwardly toward the reaction zone 404.

A. INLET ASSEMBLY

Figure 2:
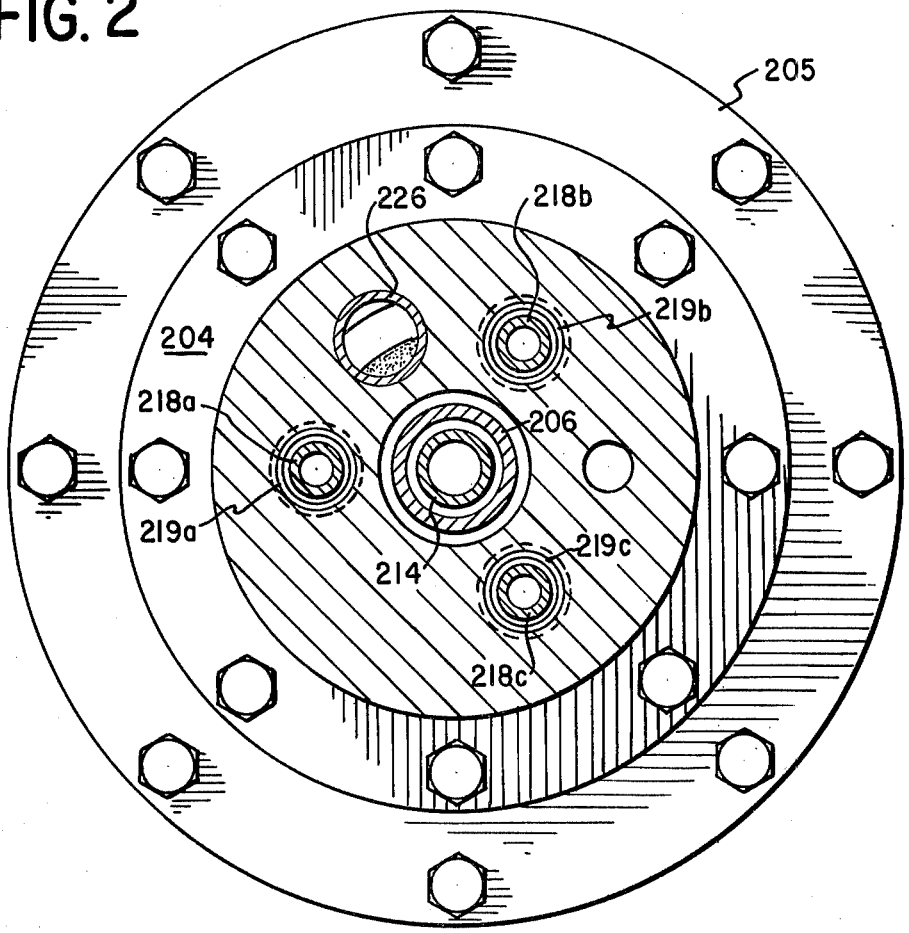
FIG. 2 is a section taken substantially along line 2—2 of FIG. 1A.

Referring particularly to FIGS. 1A and 2, the pressure vessel inlet assembly section 201 is a tubular member having first and second flanges, 202 and 203, at its respective ends. An annular nozzle block 204 is secured to an annular sealing flange 205 which, in turn, is secured in fluid-tight relationship to the first flange 202 of the inlet assembly pressure vessel section 201. A principal atomizing gas inlet tube 206 extends through the annular nozzle block 204 and is fixedly secured thereto by a support flange 207. An O-ring 209 in the support flange 207 assures a fluid-tight seal between the principal atomizing gas inlet tube 206 and the flange 207. An inlet fitting 210 is secured to an end of the principal atomizing gas inlet tube 206 as shown in FIG. 1A. Atomizing gas enters a plenum 211 through inlet 212.

A principal liquid reactant inlet tube 214 is disposed within the principal atomizing gas inlet tube 206 and extends substantially coextensively therewith. A principal liquid reactant enters the tube 214 through inlet 215 in fitting 210.

Figure 1B:
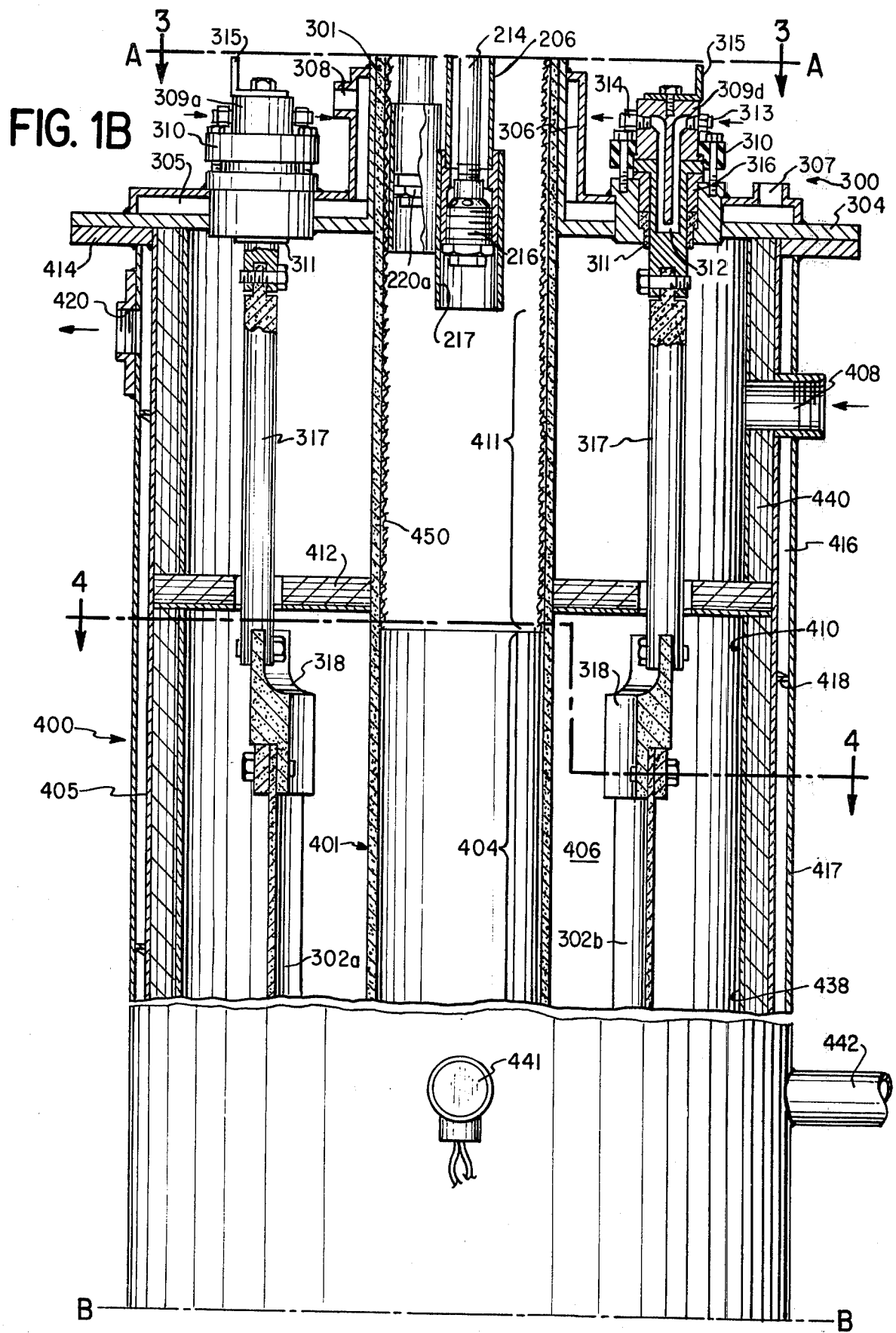

As best shown in FIG. 1B, a fogging nozzle 216 is secured to the outlet end of both the principal atomizing gas inlet tube 206 and the principal liquid reactant inlet tube 214. The fogging nozzle 216 includes a tubular shroud 217 which is secured to and disposed radially outwardly of the nozzle as shown. The axis of the shroud 217 is substantially parallel to the axis of the reactor tube 401. In operation, the liquid reactant and the atomizing gas are directed under pressure through tubes 214 and 206, respectively, and, under pressure, are mixed within the nozzle 216. The liquid reactant is thus dispersed from the nozzle outlet as a fog which absorbs radiant energy. The shroud 217 serves to assist in containing the liquid reactant fog centrally within a pre-reaction zone 411 of the reactor tube 401.

As shown best in FIGS. 1A and 2, the inlet assembly of the preferred embodiment of the present reactor may further include a plurality of secondary inlet tubes 218a, 218b, and 218c which enable the introduction of additional liquid reactants. The means for introducing the secondary liquid reactant are structurally and functionally similar to the means for introducing the principal liquid reactant, previously described, and thus further embody secondary atomizing gas inlet tubes 219a, 219b, and 219c and fogging nozzles such as 220a (the additional fogging nozzles are not shown). A representative inlet for a secondary liquid reactant and a representative inlet for a secondary atomizing gas are designated by reference numerals 221 and 222, respectively.

The above discussion presumes that the reactants themselves either exhibit a relatively high radiation absorption coefficient (a) or can be converted into a fog which absorbs radiant energy. However, if such is not the case, a radiant energy absorptive target must be introduced into the reactor zone 404 coincident with at least one point along the path of the reactants. The target medium may be a finely divided solid such as carbon powder or other suitable material which enters the reaction zone together with the reactants and absorbs sufficient radiant energy to raise the temperature of the reactants to the required level. Alternatively, the target may be a liquid such as tar, asphalt, linseed oil or diesel oil, and may include solutions, dispersions, gels and suspensions of varied make-up which may be readily selected from available materials to suit particular requirements. The target may be a gas which preferably exhibits absorption in the electromagnetic spectrum from about 100 microns to about 0.01 microns; such gases include ethylene, propylene, oxides of nitrogen, bromine, chlorine, iodine, and ethyl bromide. The target may also be a solid element made of a material such as carbon which is disposed in the reaction zone 404 along at least a portion of the path of the reactants.

Referring particularly to FIG. 1A, a sweep gas assists in directing the liquid reactant fog toward the reaction zone 404. The sweep gas enters nozzle block 204 through sweep gas inlet fitting 225, passes through channel 227 and is directed axially of the reactor tube 401 toward the pre-reaction zone 411.

As shown in FIGS. 1A and 2, a reaction viewport 226 provides an axial view into the reaction zone 404.

ELECTRODE ASSEMBLY

Referring particularly to FIGS. 1B, 3, 4 and 5, the tubular electrode assembly pressure vessel section 310 has first and second flange portions 303 (shown in FIG. 1A) and 304, respectively. Electrode assembly pressure vessel section 310 is secured at its first flange 303 to the second flange 203 of the inlet assembly pressure vessel section 201 in fluid-tight relationship. A coolant channel 305 is defined between the electrode assembly pressure vessel section 301 and an electrode assembly cooling jacket 306. Coolant enters the channel 305 through inlet 307 and exits through outlet 308.

Figure 3:
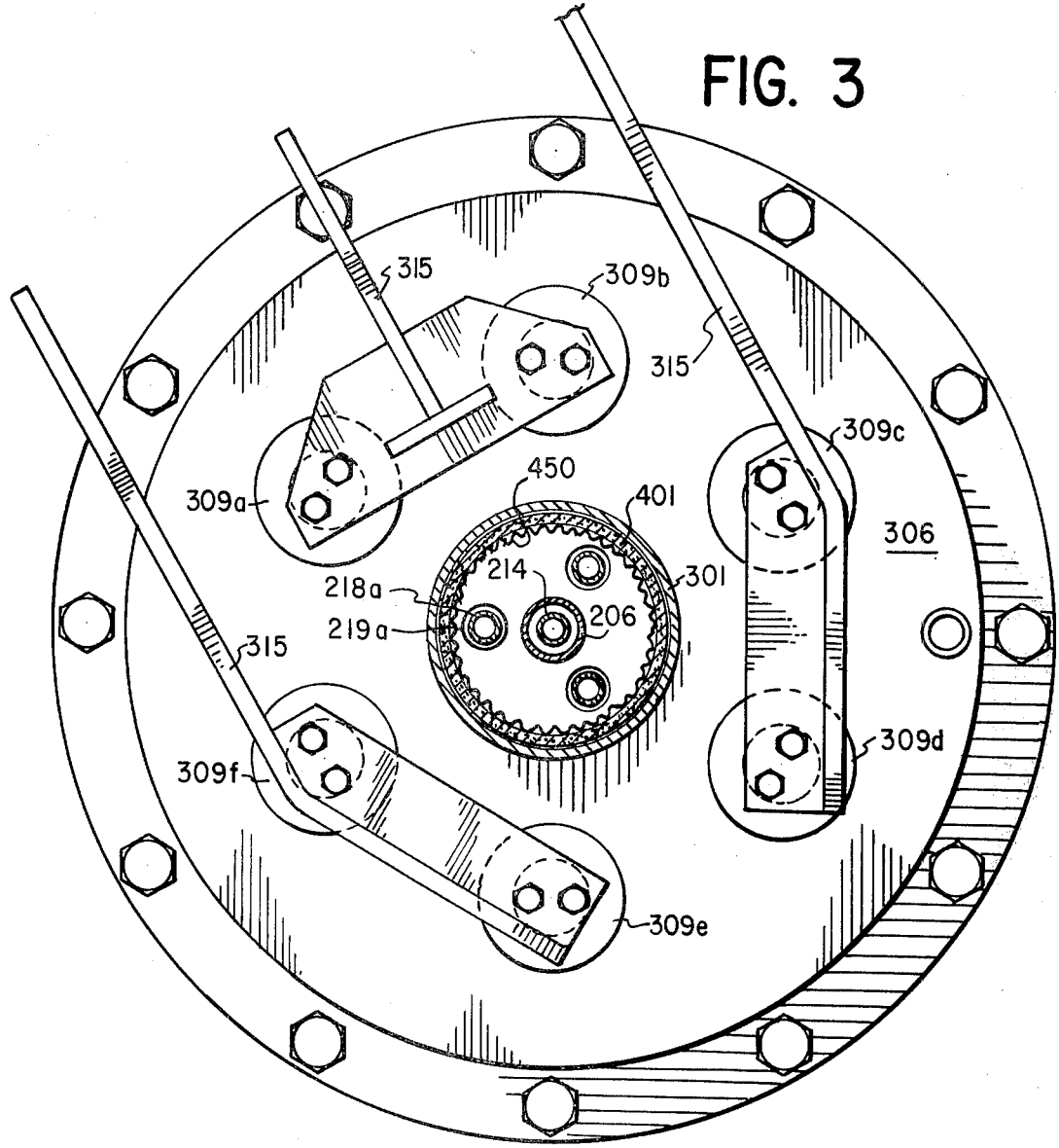
FIG. 3 is a section taken substantially along line 3—3 of FIG. 1B; ;p
Figure 11:
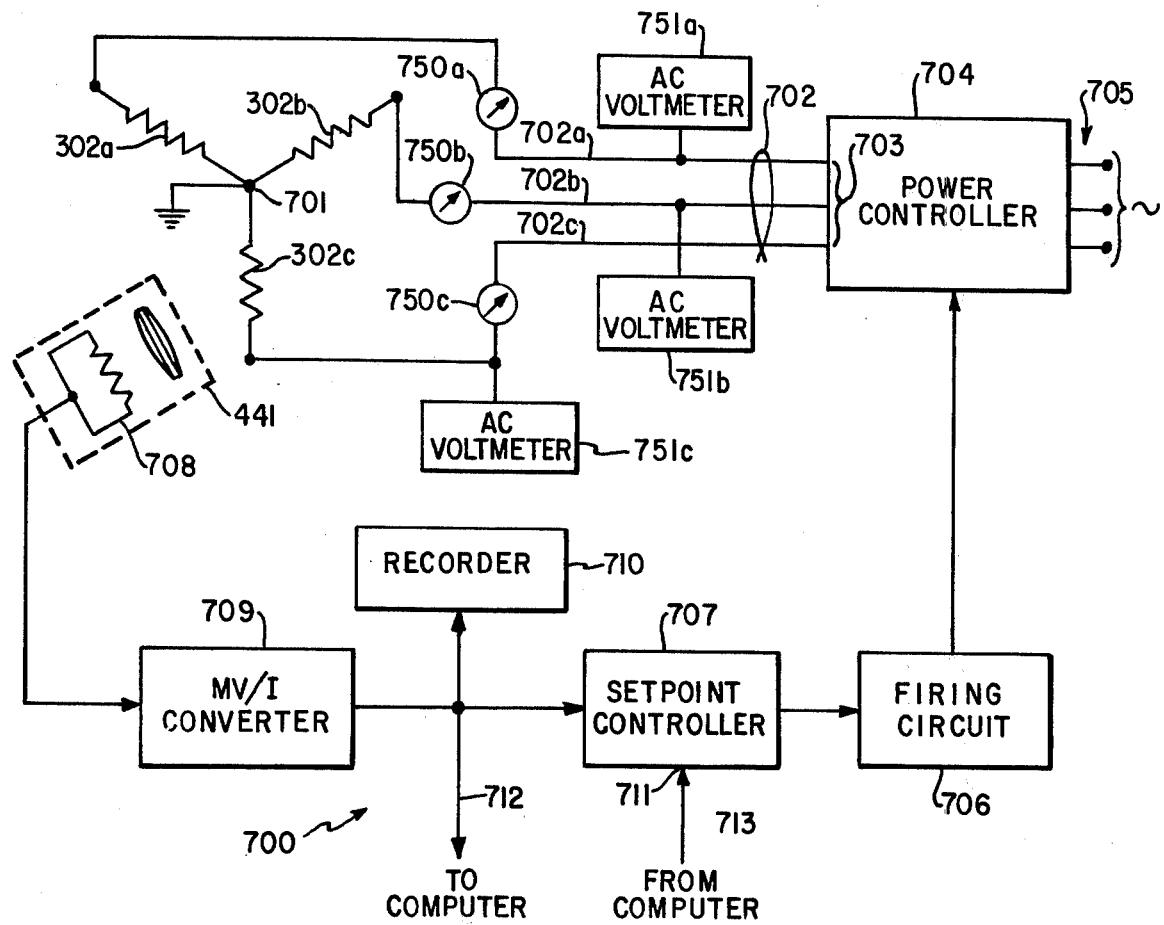
FIG. 11 is a schematic diagram of the temperature regulation circuit of the reactor of the present invention.

As shown best in FIGS. 1B and 3, copper bus bar electrodes 309a–309f are mounted on and extend through the second flange 304 of the tubular electrode assembly pressure vessel section 301. Although there are six such electrodes 309, as a matter of convenience only one is actually shown in detail in FIG. 1B. Each copper bus bar electrode 309 includes a phenolic flange 310 and a ceramic insulator 311. Each such electrode 309 is cooled by a fluid, preferably ethylene glycol, which circulates in an internal channel 312, entering through inlet 313 and exiting through outlet 314. An electrical connection is illustrated at 315. A polytetrafluoroethylene seal 316 assists in preventing any leakage from inside the inert fluid plenum 406. Although, as illustrated in FIG. 11, the electrical system employed in connection with the present reactor is of the 3-phase "Y" connection type, other systems may be used where circumstances warrant.

Figure 1C:
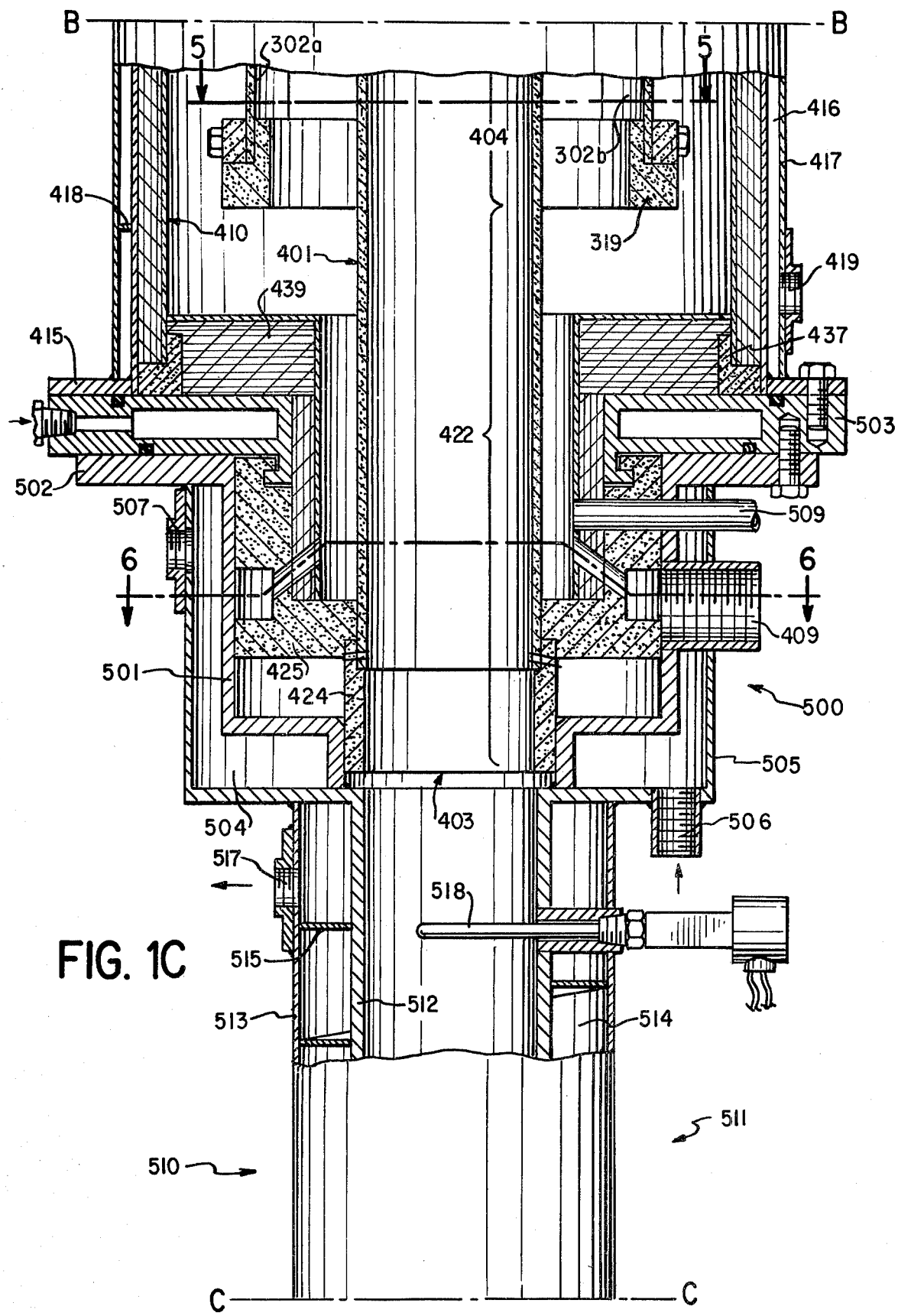

Referring particularly to FIGS. 1B and 1C, each copper electrode 309 is secured by a tongue and groove connection to a first extremity of a rigid carbon electrode extension 317. The electrode extensions 317 project through but do not contact a first end section 412 of the heat shield 410 and are secured at a second extremity to an arcuate heating element support 318. As shown best in FIG. 4, heating elements 302a–302c are secured at a first end to one of the arcuate heating element supports 318 and are spaced circumferentially about the reactor tube 401 within the inert fluid plenum 406. The heating elements are secured at a second end to a 3-phase center connection ring 319 as shown in FIGS. 1C and 5. Preferably, each electrically resistive heating element 302 is made of a fabric of a fibrous refractory material such as graphite or carbon. Heating element supports 318 and center connecting ring 319 may be made of an electrically-conductive, refractory material such as carbon.

C. MAIN ASSEMBLY OF THE REACTOR

Figure 4:
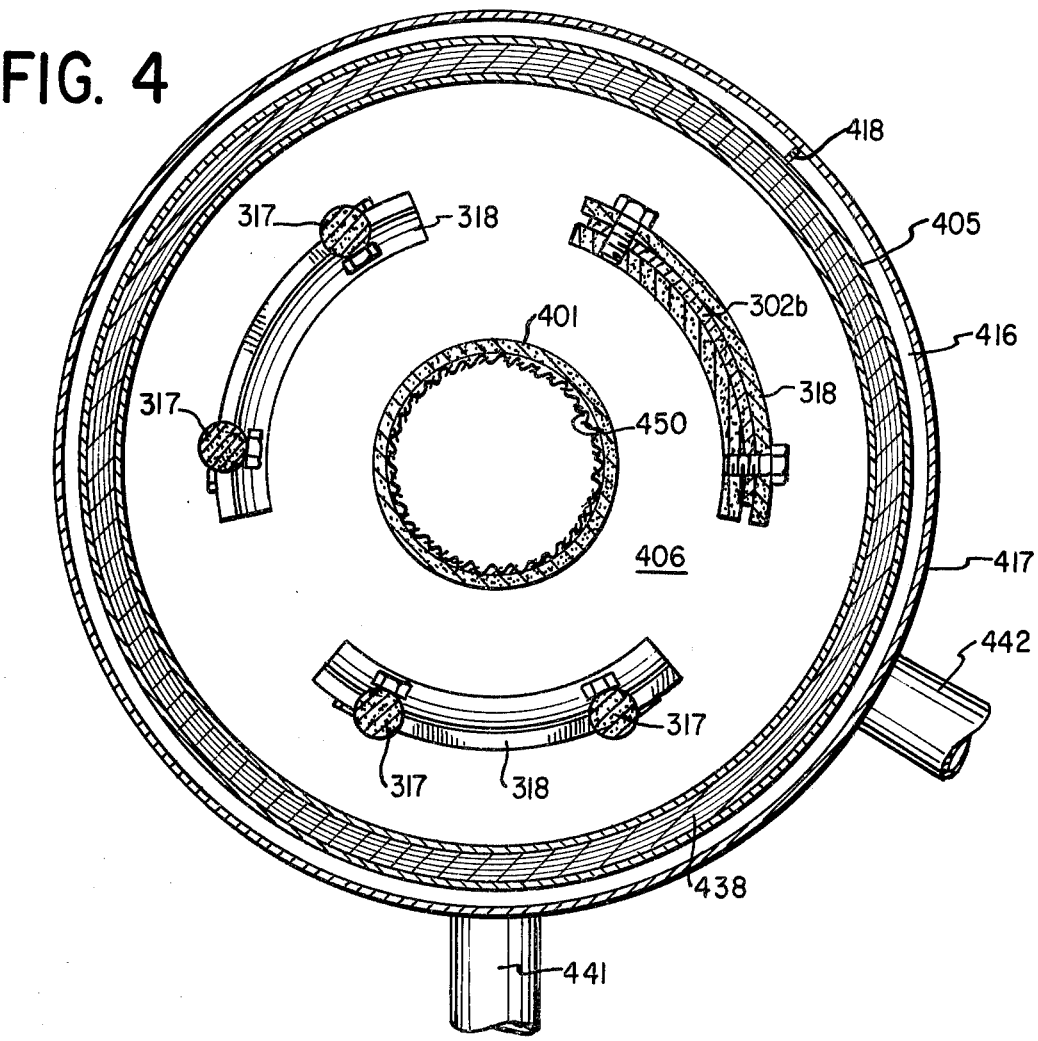
FIG. 4 is a section taken substantially along line 4—4 of FIG. 1B.
Figure 5:
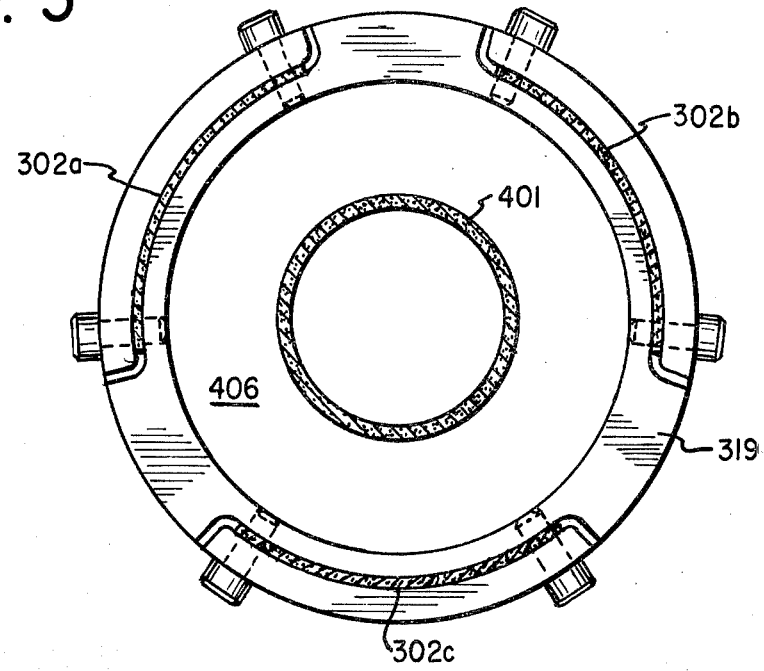
FIG. 5 is a section taken substantially along line 5—5 of FIG. 1C.

Referring to FIGS. 1B, 1C and 4, the tubular main assembly pressure vessel section 405 has first and second flange portions 414 and 415, respectively. Section 405 is secured at its first flange 414 in fluid-tight relationship to the second flange 304 of the electrode assembly pressure vessel section 301. A main assembly coolant channel 416 is defined between the main assembly pressure vessel section 405 and a main assembly cooling jacket 417. The channel 416 is further defined by a spiral baffle 418. Coolant enters the spiral channel 416 through inlet 419 and exists through outlet 420.

The reactor tube 401 includes three zones: the pre-reaction zone 411, the reaction zone 404, and a post-reaction zone 422. As previously stated, the reactor tube 401 is made of a fabric of fibrous refractory material such as carbon or graphite. The fabric may be knitted, woven, or non-woven. The reaction tube 401 is secured at its outlet end 403 to a reactor tube outlet support ring 424 which, in turn, is secured in place by a reactor tube anchor block 425. The reactor tube 401 is secured at its inlet end 402 to a reactor tube inlet support ring 426 which, in turn, is joined in fluid-tight relationship to a tubular bellows 427 disposed within the pressure vessel inlet assembly section 201. An inlet end of the bellows 427 is secured in a fluid-tight manner between the first flange 202 of the pressure vessel inlet assembly section 201 and the annular sealing flange 205 to insure that the inlet end of the reactor tube 401 remains sealed from the plenum 406. The bellows 427 is deformable to accomodate axial expansion and contraction of the reactor tube 401.

Means for applying an axial tensile force to the reactor tube 401 comprises three identical assemblies spaced equidistant about the circumferential surface of the pressure vessel inlet assembly section 201. For convenience, the assembly 428 which is illustrated in FIG. 1A shall be described. Each assembly 428 includes a translatable push rod 429 secured at one end to the reactor tube inlet support ring 426 and at an opposite end to an annular plate 430. Each push rod 429 is supported in a bearing 431 which is sealed in a fluid-tight manner by O-ring 432. Eye-bolt 433 which is secured to the annular plate 430 anchors a cable 434 which extends generally parallel to the longitudinal axis of the reactor and over a pulley assembly 435. A weight 436 secured to an opposite end of the cable 434 applies a force which maintains the reactor tube 401 in axial tension.

Referring particularly to FIGS. 1B and 1C, the heat shield 410 includes a first circumferential section 438 which is disposed within the pressure vessel main assembly section 405, radially outwardly of the heating elements 302a, 302b and 302c and between the first end section 412 and a second end section 439 of the heat sheild 410. As shown in FIG. 1C, the first circumferential section 438 of heat shield 410 rests in a seating ring 437 which is preferably made of carbon. If desired, the first circumferential portion of the heat shield 410 may be extended in a direction toward the electrode assembly 300 to include a second circumferential portion 440 as shown in FIG. 1B.

In that the heat shield 410 reflects rather than transfers heat, it functions as an insulator and may thus be made of any material which exhibits this characteristic and which can withstand the temperatures generated by the heating elements 302a, 302b and 302c. Although molybdenum has been found to be a satisfactory material for a heat shield of a type required in the present high temperature chemical reactor, it is preferred that the heat shield 410 be made of a graphitic material such as pyrolytic graphite or a material manufactured by Union Carbide Corporation and sold under the tradename "Grafoil".

Radiometer viewports 441 and 442 are provided in the main assembly section 400. Viewport 442 enables observation and measurement of the temperature of the reaction zone 404 of the reactor tube 401 and viewport 441 enables observation and measurement of the temperature of heating element 302c.

D. POST-REACTION TREATMENT ASSEMBLY

As shown in FIG. 1C, a first flange portion 502 of the post-reaction treatment assembly pressure vessel section 501 is secured in a fluid-tight manner to a fluid-cooled interface flange 503 which, in turn, is secured in a fluid-tight manner to the second pressure vessel main assembly section flange 415. A coolant channel 504 is defined between post-reaction treatment assembly cooling jacket 505 and the post-reaction treatment assembly pressure vessel section 501. Coolant flows into the channel 504 through inlet 506 and exits through outlet 507. Radiometer viewport 509 is provided to enable observation and temperature measurement within the post-reaction zone 422 of the reactor tube 401.

Reaction products exiting the outlet end 403 of the reactor tube 401 of the embodiment of FIG. 1 pass into a first section 510 of heat sink 511. As shown in FIGS. 1C and 1D, the first section 510 of the heat sink 511 includes an inner tubular wall 512 and an outer tubular wall 513 which define therebetween a coolant channel 514. Spiral coolant baffle 515 directs the coolant which enters through inlet 516 and exits through outlet 517. A first thermocouple probe 518 which extends into the first section 510 of the heat sink 511 enables the measurement of temperature of the entering reaction products. A second thermocouple probe 519 which extends into the first section 510 of the heat sink 511 measures the temperature of the reaction products about to exit.

Figure 1D:
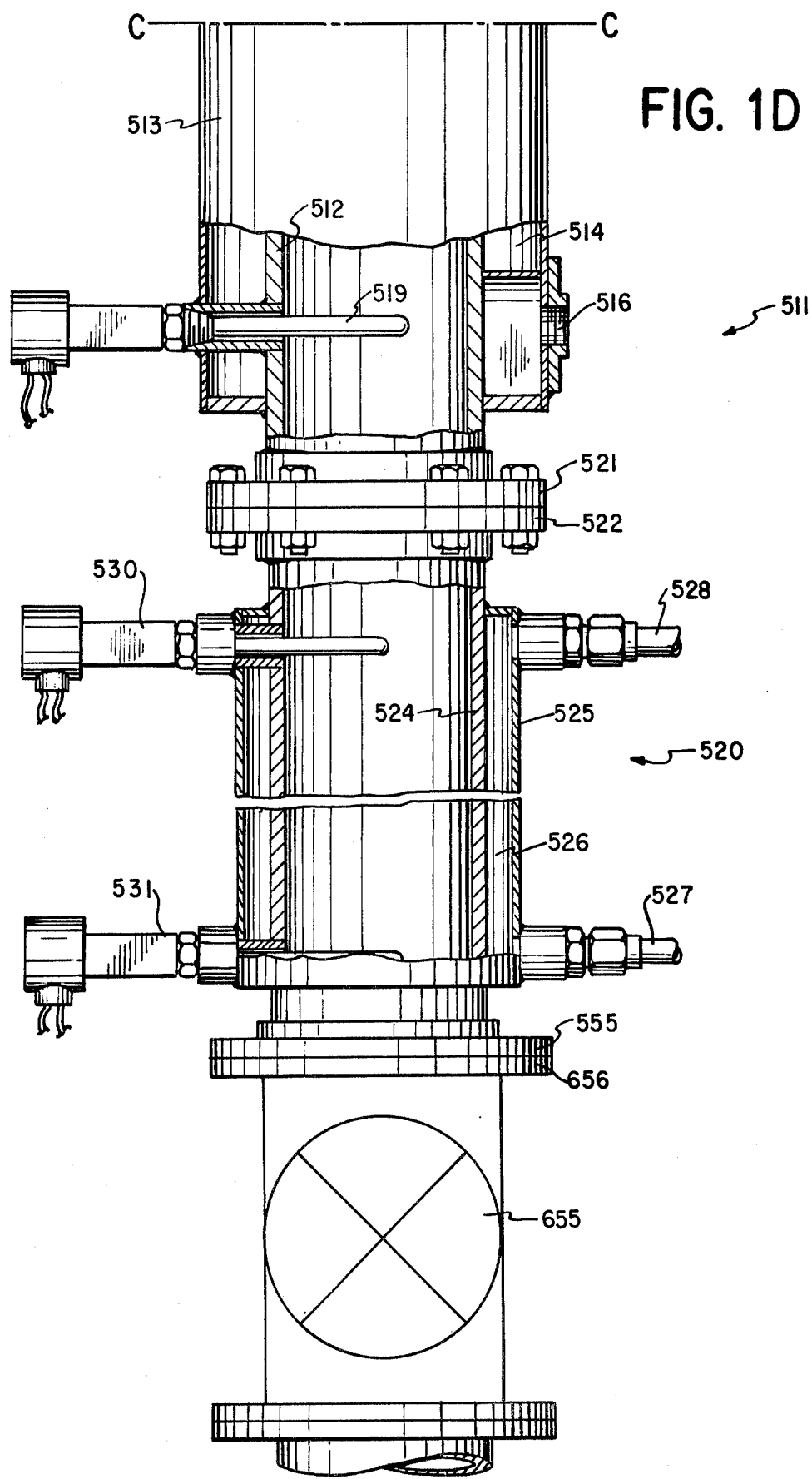
Figure 6:
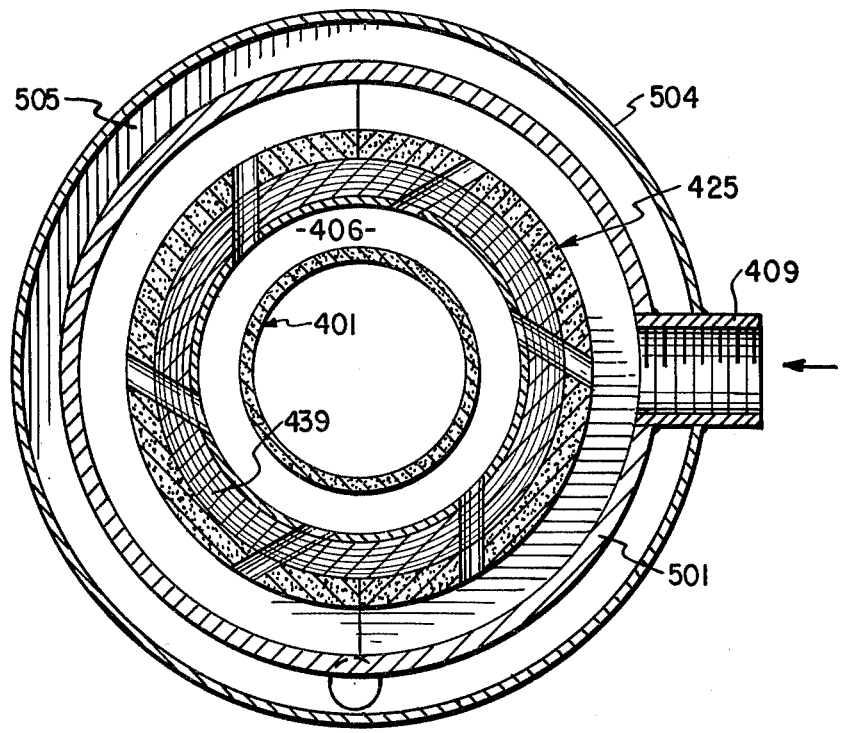
FIG. 6 is a section taken substantially along line 6—6 of FIG. 1C.

Referring particularly to FIG. 1D, the first section 510 of the heat sink 511 is joined to a second section 520 by flanges 521 and 522, respectively. The second section 520 includes an inner wall 524 and an outer wall 525 which define therebetween a coolant channel 526. Coolant enters the channel 526 through inlet 527 and exits through outlet 528. Thermocouple probes 530 and 531 enable measurement of the temperature of reaction products entering the second section 520 and exiting the second section 520, respectively.

In the embodiment of FIG. 7, a post-reaction treatment assembly 500a includes a post-reaction treatment assembly pressure vessel section 501a having a flange portion 502a which is secured in a fluid-tight manner to a fluid-cooled, interface flange such as flange 503 illustrated in FIG. 1C. A coolant channel 504a is defined between a post-reaction treatment assembly cooling jacket 505a and the post-reaction treatment assembly pressure vessel section 501a. Coolant flows into the channel 504a through inlet 506a and exits through outlet 507a. Radiometer viewport 509a enables observation and temperature measurement in the post-reaction zone 422 of the reactor tube 401.

Reaction products exiting the outlet end 403 of the reactor tube 401 of the embodiment of FIG. 7 at high temperature pass into a variable profile, counter-flow heat exchanger 532 which abuts the reactor outlet 403 at its inlet end 533. The heat exchanger 532 includes an inner tubular wall of refractory material 534, an outer tubular wall of refractory material 535 spaced concentrically outwardly from the inner wall 534, and a spiral baffle of refractory material 536 disposed between the walls 534 and 535 to define a spiral, annular coolant channel 537. The inner tubular wall 534, outer tubular wall 535 and spiral baffle 536 together constitute a high temperature spiral heat exchanger assembly 544 which rests on a resilient carbon felt cushion 545 disposed on end plate 546 of heat exchanger pressure vessel section 547. Coolant inlets 538, 539 and 540 extend through the outer tubular wall 535 in communication with the spiral coolant channel 537.

In the specific embodiment illustrated in FIG. 7, after circulating throughout the spiral coolant channel 537 in a pre-selectable, variable, and controllable manner, the coolant is discharged at an outlet 541 of the spiral annular channel 537 adjacent the inlet end 533 of the heat exchanger 532. Thereafter, the coolant circulates through inlet port 542 in reactor tube anchor block 425a into the inert fluid plenum 406. In such case, it is apparent that the coolant employed should be a fluid which is the same as or, at least, compatible with the inert fluid which is present in the plenum 406. However, since the operation of the heat exchanger 532 does not require that the coolant be circulated into the plenum 406, alternative circulation patterns and expedients are feasible. In such instances, the choice of coolant fluid is not limited by the criteria set forth above. Circumferential heat exchanger cooling jacket 548 is spaced radially outwardly of the heat exchanger pressure vessel section 547, defining therebetween an annular channel 549. Coolant is introduced into channel 549 through inlet 550 and exits through outlet 551.

E. INLET ASSEMBLY FOR SOLID REACTANTS

Figure 8A:
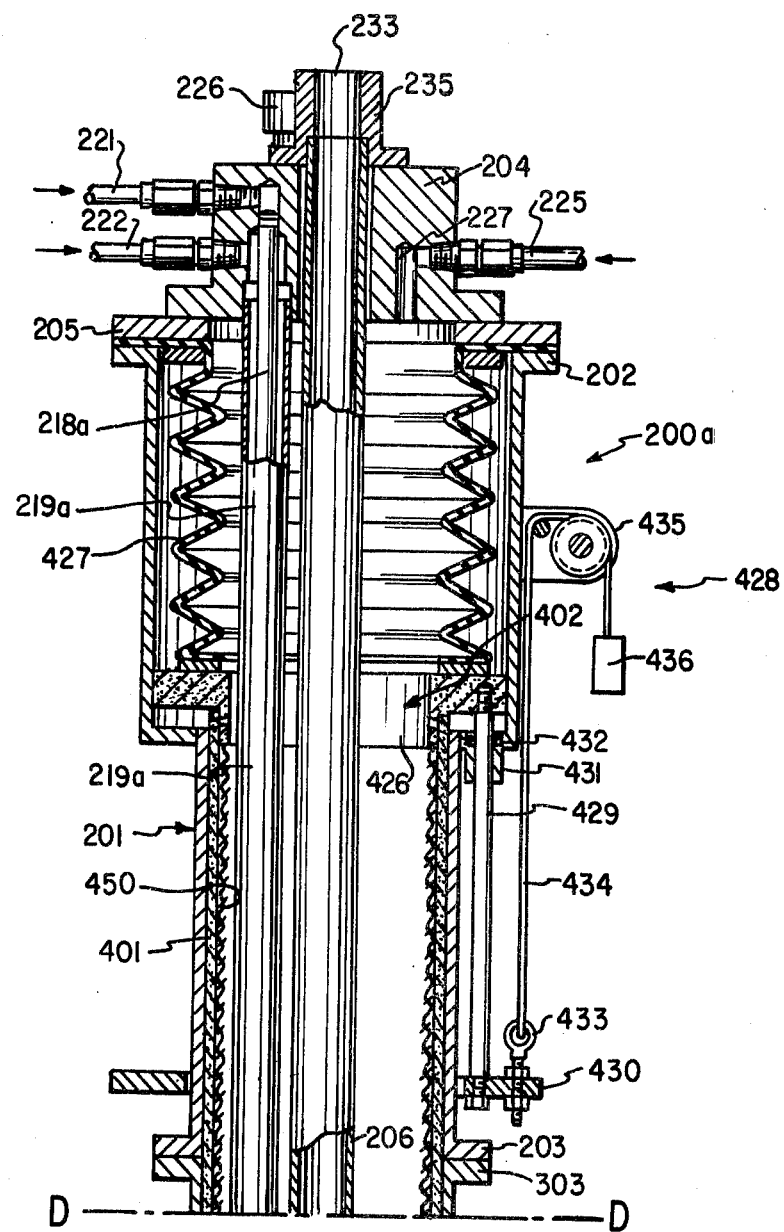

Inlet assembly 200a of the embodiment of FIGS. 8A and 8B is substantially identical to the inlet assembly 200 of FIGS. 1A and 1B except that means for introducing a principal solid reactant of inlet assembly 200a replaces the means for introducing a principal liquid reactant of inlet assembly 200. For convenience, only the features of the embodiment of FIGS. 8A and 8B which differ from corresponding features of the embodiment of FIGS. 1A and 1B shall be described.

A solid reactant inlet tube 232 extends through the annular nozzle block 204 and is fixedly secured thereto by a support flange 235. A principal solid reactant, preferably finely divided, enters inlet tube 231 through inlet 233 in support flange 235 and exits within reactor tube 401 adjacent the prereaction zone 411. Secured to and disposed radially outwardly of outlet 234 is a tubular shroud 217, the axis of which is substantially parallel to the axis of the reactor tube 401. Shroud 217 assists in containing finely divided solid reactants centrally within the prereaction zone 411 of reactor tube 401.

Referring to FIG. 9, a solid reactant feed system 238 is shown in combination with a high-temperature reactor having an inlet assembly 200a of the type depicted in FIGS. 8A and 8B. A supply bin 240 for holding the solid reactant feeds a crusher 241, which, in turn, feeds a sieve 242. Coarse product output 245 of the sieve 242 is recycled to the crusher 241 and fine product output 243 is fed to a hopper 244 which is secured to an elongated tubular housing 246. Helical feed screw 247 is rotatably mounted within the housing 246 and is driven by motor 248. A pressure-sealing fluid may be introduced into the housing 246 through an inlet nozzle 249 located at a point downstream from the hopper 244; the interior of reactor tube 401 is thus sealed from the atmosphere. The solid reactant and the sealing fluid are discharged from housing 246 into the reactor through an outlet 250.

F. REFRACTORY COATING AND ETCHING SYSTEMS

For reasons set forth below, it is contemplated that a refractory coating may be deposited on surfaces of reactor tube 401, heating elements 302, and heat shield 410 which are exposed to the blanket gas and to high temperatures during operation of the reactor. Such refractory coating may be, for example, pyrolytic carbon or a refractory oxide such as thorium oxide, magnesium oxide, zinc oxide, aluminum oxide, or zirconium oxide. It is further contemplated that portions of the surface of the reactor tube 401 may be selectively etched or eroded.

Figure 10:
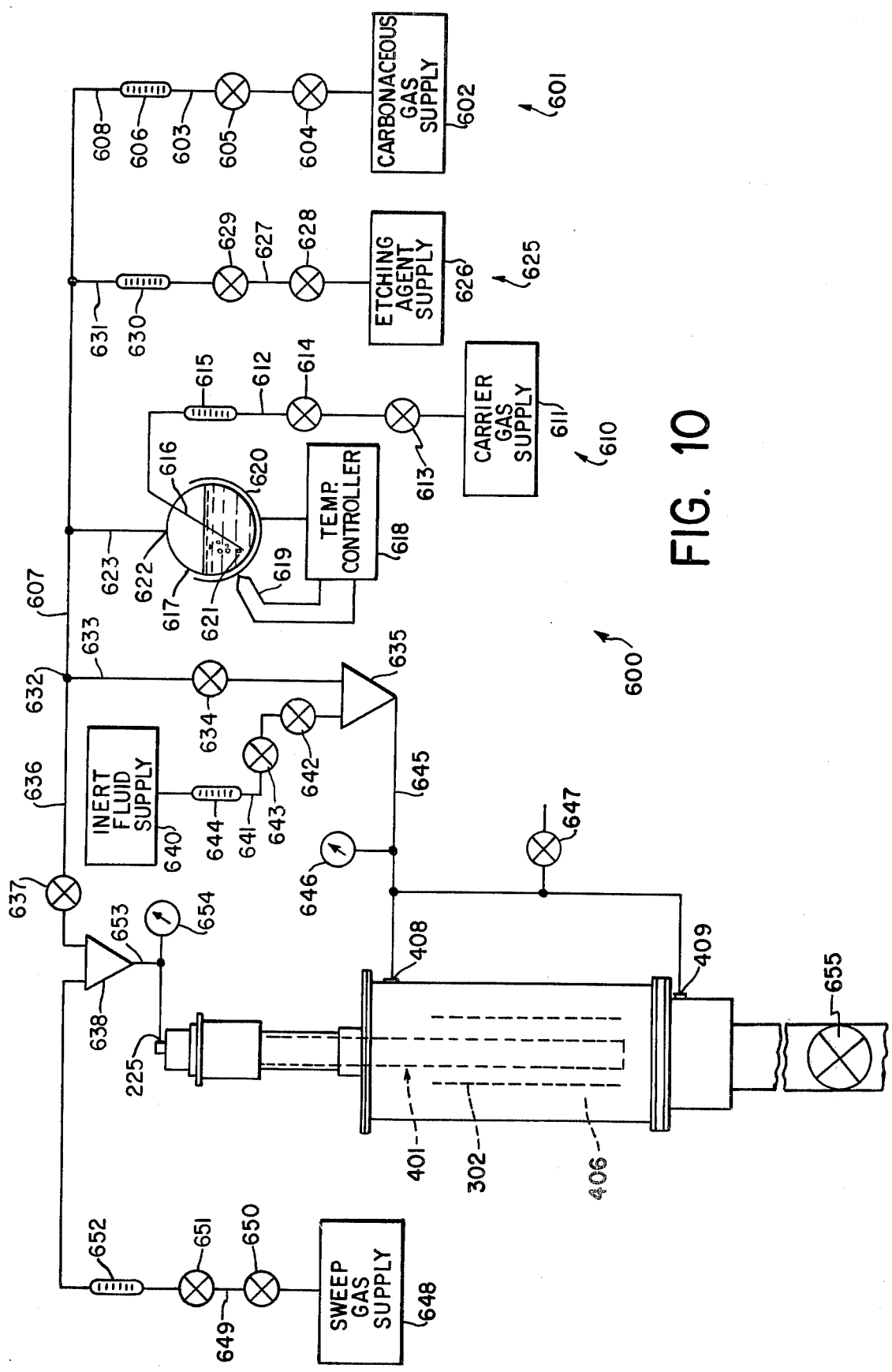
FIG. 10 is a schematic representation illustrating the refractory coating and etching systems of the reactor of the present invention.

Referring to FIG. 10, a refractory coating and etching system 600 is schematically represented and comprises a first refractory deposition agent metering system 601 having a carbonaceous gas supply 602 connected to a carbonaceous gas metering line 603. The metering line 603 has an on/off valve 604 connected to a needle valve 605 and a flow meter 606. A first feeder line 608 connects the carbonaceous gas metering line 603 to an admixture gas supply line 607.

A second refractory deposition agent metering system 610 includes a carrier gas supply 611 connected to a carrier gas metering line 612 which has an on/off valve 613, a needle valve 614, and a flow meter 615. The carrier gas metering line 612 is connected to a bubble tube 616 disposed within a tank 617 which contains a solution of a volatile metal-containing compound. The temperature of the tank 617 is regulated by a temperature controller 618 which senses the temperature of the tank by a thermocouple 619 and supplies heat to the tank, as required, by an electric heating mantle 620. An outlet end 621 of bubble tube 616 is submerged in the solution contained in the tank 617. An outlet 622 of the tank 617 connects a second feeder line 623 to the tank 617 at a point above the solution surface. The second feeder line 623 is also connected to the admixture gas supply line 607.

In an etching agent metering system 625, an etching agent supply 626 is connected to an etching agent metering line 627 which includes, in series, an on/off valve 628, a needle valve 629, and a flow meter 630. Connected to the etching agent metering line 627 is a third feeder line 631, which is connected to the admixture gas supply line 607.

The three lines 608, 623, and 631, all feed into the admixture gas supply line 607, which branches at a T-joint 632. A first branch line 633 includes a first branch line valve 634 and is connected to a first inlet of an inert fluid mixing manifold 635. A second branch line 636 includes a second branch line valve 637 and is connected to a first inlet of a sweep gas mixing manifold 638.

An inert fluid supply 640 is connected to an inert fluid metering line 641 which includes an on/off valve 642, a needle valve 643 and a flow meter 644 which is connected to a second inlet of inert fluid mixing manifold 635. An outlet of mixing manifold 635 is connected to an inert fluid supply line 645 which, in turn, is connected to the pressure vessel inlets 408 and 409 for directing the inert fluid into the inert fluid plenum 406. A plenum pressure sensor 646 is connected to the inert fluid supply line 645 and is in communication with the plenum 406 for measuring the pressure of the inert fluid within the plenum. A plenum exhaust valve 647 is also connected to the inert fluid supply line 645 and provides an outlet for discharging fluid from the plenum.

A sweep gas supply 648 is connected to a metering line 649 which includes an on/off supply valve 650, a needle valve 651, and a flow meter 652 which is connected to a second inlet of the sweep gas mixing manifold 638. An outlet of mixing manifold 638 is connected to a sweep gas supply line 653 which, in turn, is connected to the sweep gas inlet fitting 225 for introducing the sweep gas into the interior of the reaction tube 401. A reaction zone pressure sensor 654 which connects to the sweep gas supply line 653 and which communicates with the interior of the reactor tube 401, measures the pressure in the reaction zone of the reactor.

As best shown in FIG. 1D, a reactor tube outlet closure valve 655 is secured to the second section 520 of the heat sink 511 by flanges 555 and 656.

When the reactor is in operation, a pressure differential must be maintained between the inert fluid in plenum 406 and gas in the reactor tube 401 to cause a uniform flow of inert fluid radially inward through the porous wall of the tube 401. It is thus advantageous that the fabric of tube 401 be sufficiently stiff that the pressure differential may be maintained without inward collapse of the tube 401. Accordingly, it is contemplated that a refractory coating such as pyrolytic carbon be deposited upon portions of the fibrous refractory material of the reactor tube 401 which are disposed within the black body cavity to increase the stiffness or dimensional stability of the fabric.

To deposit such coating, reactor tube outlet closure valve 655 is closed and the reactor tube 401 is heated to about 3450° F. Next, the on/off valve 650 in the sweep gas metering line 649 is opened, the on/off valve 642 in the inert fluid metering line 641 is closed, and the plenum exhaust valve 647 is opened, permitting sweep gas to flow into the interior of the reactor tube 401, then radially outwardly through the porous wall of the tube 401 into the plenum 406, and, finally through the pressure vessel inlets 408 and 409 and the plenum exhaust valve 647. This tends to expand the tube 401 to its maximum diameter. Thereafter, the on/off valve 604 in the carbonaceous gas metering line 603 is opened. The needle valves 605 and 651 are adjusted to set the flow rates of the carbonaceous gas and the sweep gas, respectively, to suitable values as registered on flow meters 606 and 652. The first branch line valve 634 is closed and the second branch line valve 637 is opened so that the carbonaceous gas flows through the first feeder line 608, the admixture gas supply line 607, the T-joint 632, the second branch line 636, and into the sweep gas mixing manifold 638 where it mixes with the sweep gas and flows into the interior of the reactor tube 401 through sweep gas supply line 653 and sweep gas inlet fitting 225.

The carbonaceous gas dissociates on the heated surfaces which it contacts, depositing a pyrolytic graphite coating. Thus, pyrolytic graphite is generally deposited on the portions of the reactor tube 401, the heating elements 302, and the heat shield 410 which are within the black body cavity.

Since the portion of the reactor tube 401 which lies within the pre-reaction zone 411 is outside of the black body cavity and, thus, may not be heated conveniently to temperatures above the decomposition temperature of the carbonaceous gas, it is contemplated that a stainless steel screen 450, shown in FIGS. 1A and 1B, be provided to prevent the flexible reactor tube 401 from collapsing inwardly under the pressure differential of the inert fluid, although it has been found that increased tension on the porous fabric accomplishes substantially the same result.

To control the rate of flow of inert fluid through the walls of the reactor tube 401, the diameter of the pores in the tube wall may be reduced or enlarged while the reactor is in operation by mixing a refractory deposition agent or an etching agent with the inert fluid. The pressure differential between the plenum and the reaction zone may be monitored by the pressure sensors 646 and 654 and the rate of flow of inert fluid through the wall may be monitored by the flow meter 644.

When the pressure differential becomes too low for the desired rate of flow of inert blanket gas, the diameter of the pores in the tube of the reactor wall may be reduced by opening the on/off valve 604 and adjusting the needle valve 605 to allow a carbonaceous gas from the carbonaceous gas supply 602 to flow through carbonaceous gas metering line 603. The second branch line valve 637 is closed and the first branch line valve 634 is opened to direct the carbonaceous gas into the inert fluid mixing manifold 635 and thence into the plenum 406 through the inert fluid supply line 645 and the pressure vessel inlets 408 and 409. The plenum exhaust valve 647 remains closed and the reactor tube outlet closure valve 655 remains open during normal operation of the reactor. The carbonaceous gas dissociates on the heated surfaces within the reactor which it contacts. Accordingly, carbonaceous gas which flows into the pores of the fabric of the wall of reactor tube 401 dissociates, depositing a coating of pyrolytic graphite which reduces pore diameter. Since the pressure differential across the reactor tube wall will increase for a fixed flow of inert fluid, the decrease in porosity of the tube may be monitored with pressure sensors 654 and 646 and flow meter 644 as the graphite is deposited. When the pressure differential exceeds a predetermined value, the growth of the graphite coating may be halted by closing the on/off valve 604 in the carbonaceous gas metering line 603. The entire process of reducing the diameter of the pores in the reactor tube wall may be carried out without interrupting the operation of the reactor.

Conversely, it may be necessary to increase the diameter of the pores of the reactor tube 401. In this case, an etching agent such as steam or molecular oxygen from the etching agent supply 626 is mixed with the inert fluid by opening valve 628, adjusting needle valve 629 in the etching agent metering line 627, closing the second branch line valve 637, and opening the first branch line valve 634. The etching agent mixes with the inert fluid in inert fluid mixing manifold 635 and flows into the plenum 406 through the pressure vessel inlets 408 and 409. The etching agent attacks heated surfaces which it contacts, thereby increasing the diameter of the pores of the heated portion of the reactor tube 401. The flow of etching agent may be continued until pressure sensors 654 and 646 indicate a sufficiently low pressure differential across the reactor tube 401 for the desired rate of flow of inert fluid as monitored by flow meter 644. As with reducing the pore diameter with the carbonaceous gas, this process may be carried out while the reactor is in operation.

It may be advantageous in some applications to use steam or another medium which reacts chemically with the materials being processed as the inert fluid. To prevent or, at least, to retard the corrosion of materials of which the reactor is constructed, it is contemplated that a coating of a refractory oxide such as thorium oxide, magnesium oxide, zinc oxide, aluminum oxide, or zirconium oxide be deposited on the portions of the reactor tube 401, heating elements 302, and heat shield 410 which come into contact with the inert fluid and operate at high temperatures. To deposit a coating of refractory oxide, a refractory deposition agent which is a volatile metal-containing compound such as methylmagnesium chloride, magnesium ethoxide, or zirconium-n-amyloxide may be employed. Methylmagnesium chloride, for example, decomposes on a surface heated to about 1100° F. to deposit a coating of magnesium metal. The hot magnesium metal is subsequently oxidized by introducing steam or molecular oxygen into the plenum 406. Zirconium-n-amyloxide and magnesium ethoxide both generally decompose on heated surfaces to form zirconium oxide or magnesium oxide respectively.

Referring to FIG. 10, the volatile metal-containing compound may be introduced into the plenum 406 by causing a carrier gas from the supply 611 to flow through the metering line 612 by opening the on/off valve 613. The needle valve 614, adjusts carrier gas flow rate to a suitable value as measured by flow meter 615. The tank 617 contains, for example, a solution of the volatile metal containing compound such as methylmagnesium chloride dissolved in diethyl ether or zirconium-n-amyloxide dissolved in tetrahydrofuran. The carrier gas flows through the bubble tube 616 and into the solution of tank 617. The second branch line valve 637 remains closed and the first branch line valve 634 remains open in order that the carrier gas, solvent vapor, and metal-containing compound vapor are directed sequentially through the outlet 622 of the tank 617, the second feeder line 623, the admixture gas supply line 607, and the first branch line 633, and into the inert fluid mixing manifold 635 where they are mixed with the inert fluid and then carried to the plenum 406 over the inert fluid supply line 645 and through the pressure vessel inlets 408 and 409. The volatile, metal-containing compound decomposes on hot surfaces which it contacts within the reactor. If it decomposes into a pure metal, oxygen or steam are subsequently introduced into the plenum 406 to cause formation of the oxide.

G. PROCESS VARIABLE CONTROL SYSTEMS

FIG. 11 illustrates a reactor temperature control system 700. There, heating elements 302a, 302b and 302c are depicted in schematic form connected in a "Y" configuration circuit, one end of each heating element being connected to a tie point 701 and the other end being connected to a branch 702a, 702b, or 702c of a three-phase power line 702. The tie point 701 corresponds to the three-phase connecting ring 319 of FIG. 1C. The power line 702 connects to a heater power output 703 of a power controller 704, which, in turn, connects to a principal three-phase power line 705 and a firing circuit 706. The principal three-phase power line 705 supplies current, preferably at 540 volts, for heating the reactor. A radiometer 708 disposed within the viewport 441 of FIG. 1B is focussed on the heating element 302c and produces a signal, generally in the millivolt range, which corresponds to the temperature of the heating element. An "MV/I" converter 709 amplifies the radiometer signal and converts it to an electric current. A setpoint controller 707, an output signal line 712 for connection to a computer (not shown), and a recorder 710 which makes a permanent log of the temperature measured by the radiometer 708 are all connected to the converter 709. An input signal line 713 connects a control signal input 711 of the setpoint controller 707 a computer (not shown). Current meters 750a, 750b, and 750c are inserted in the three branches 702a, 702b, and 702c respectively, to measure the current supplied to heating elements 302a-c; and, voltmeters 751a, 751b, and 751c are tied to the branches 702a-c to measure the voltages across the heating elements. The power dissipated in the heating elements and the electrical resistance of the heating elements can be calculated from such voltage and current measurements. Knowledge of the electrical resistance of each heating element provides information as to its physical integrity since, as a heating element erodes, its electrical resistance increases.

Figure 12:
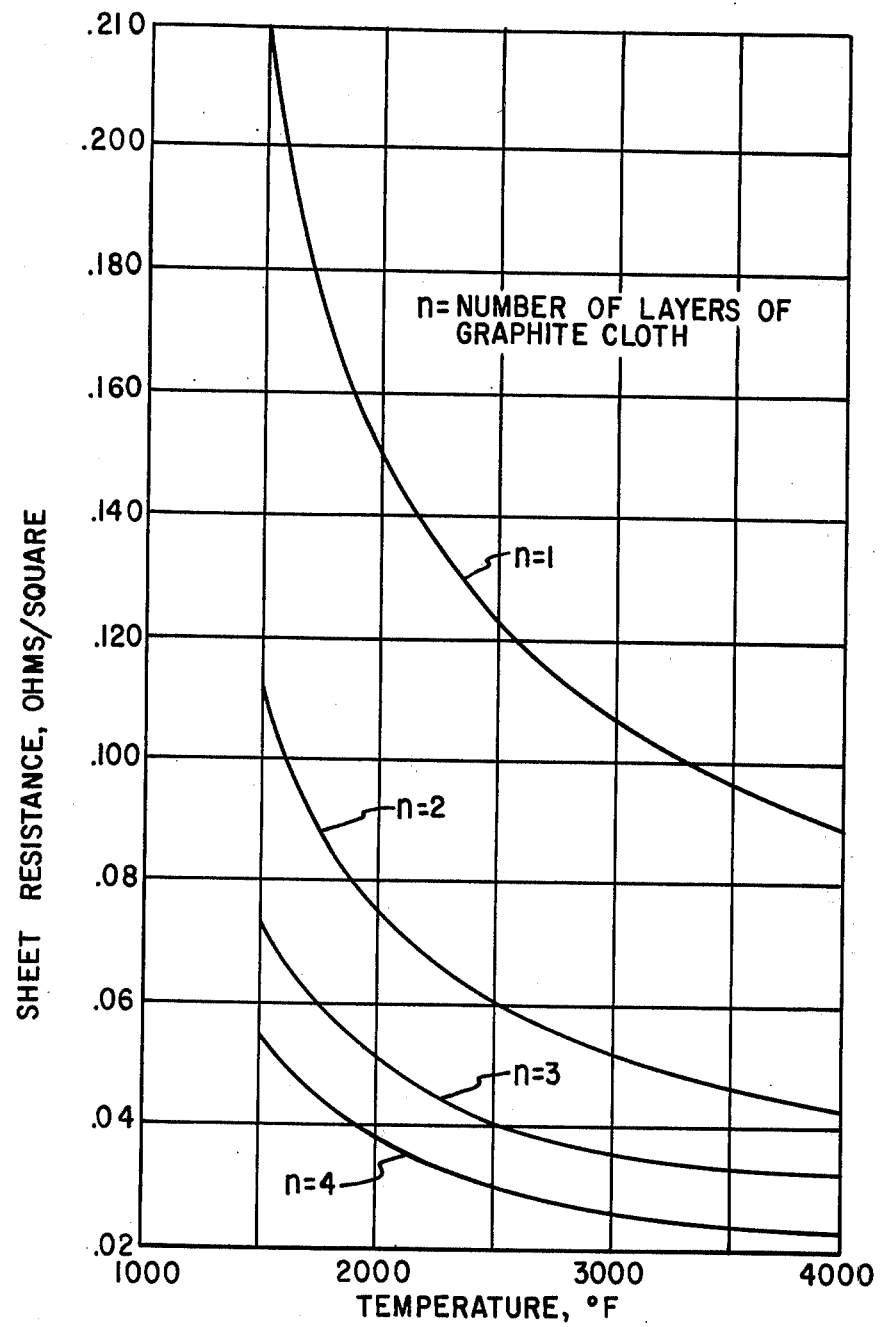
FIG. 12 is a graphical representation of the electrical resistance of a heating element of the reactor of the present invention as a function of temperature and the number of layers of refractory fabric which constitute such element.

FIG. 12 is a graph of the electrical sheet resistance of a sample of graphite cloth (sold under the trade name of "WCA Graphite Cloth" by Union Carbide Corporation) as a function of the temperature of the cloth. The cloth has been stiffened with pyrolytic graphite by heating and exposing it to an atmosphere of a carbonaceous gas, generally according to the procedure described above. The vertical axis of the FIG. 12 graph gives the sheet resistance in units of "ohms per square" since, as is known, the resistance measured between opposing edges of squares of a resistive material of a given thickness is independent of the dimensions of the square. Thus, the resistance at a particular temperature of a heating element formed from a single rectangular strip of "WCA Graphite Cloth" may be found by considering the strip to be made up of squares of the cloth connected in series. For example, the resistance of a strip 6 inches by 51 inches at 2500° F. measured between the two six-inch sides is found by multiplying (51/6) times 0.123 ohms, the sheet resistance at 2500° F. given on FIG. 12. The resistance of a heating element made up of more than one layer of fabric, each layer having the same dimensions and therefore the same resistance, is found by dividing the resistance of a single layer by the number of layers. For convenience, the calculated sheet resistances in "ohms per square" for samples of stiffened "WCA Graphite Cloth" made up of 2, 3, and 4 layers have also been graphed on FIG. 12.

In operation, after the setpoint controller 707 is set to a specified temperature either manually or by a computer, it compares such temperature with the measured temperature of the electrode 302c and produces an error signal which depends upon the algebraic difference between the measured temperature and the specified temperature. The setpoint controller 707 controls the firing circuit 706, which, in response to the error signal, causes the power controller 704 to increase or decrease the power supplied to the heating elements to reduce, as necessary, the magnitude of the error signal, causing the temperature of the heating element 302c to approach the specified temperature. Because the heating element 302c is within the black body cavity enclosed by the heat shield 410, its temperature is generally representative of the temperature of surfaces throughout the cavity. However, radiometers focussed on other surfaces within the black body cavity may also be used for temperature control.

As shown in FIG. 13, process variables in addition to temperature may be regulated by feedback control systems as, for example, a principal liquid reactant feed rate regulation system 714 which includes a supply 715 communicating with a metering system 716 over a feed line 717. The metering system 716 controls the flow rate of the principal reactant and may include, for example, a variable speed pump and pump controller or a variable orifice valve and valve controller. An output 718 of the principal reactant metering system 716 is connected to a flow rate transducer 719 which produces an electrical signal output 720 corresponding to the rate of flow of the principal reactant. An output 721 of the principal reactant flow rate transducer 719 is connected to the principal liquid reactant inlet pipe 215. A signal output 722 of the reaction zone pressure sensor 654 and the signal output 720 of the flow rate transducer 719 are connected to the first and second signal inputs, respectively, of the principal reactant metering system 716. An output of a computer system 723 is connected to a third input of the metering system 716.

In one mode of operation of the principal liquid reactant feet rate regulation system 714, the computer system 723 communicates both a pre-selected value for the principal reactant flow rate and an upper limit for the reaction zone pressure to the principal reactant metering system 716 which compares the pre-selected flow rate with that measured by the transducer 719 and adjusts the flow rate of approach the selected value, provided, however, that the reaction zone pressure is below the prescribed upper limit. Should the reaction zone pressure exceed this upper limit, the metering system 716 will lower the pressure by reducing the flow rate of the principal reactant.

A secondary liquid reactant flow rate regulation system 724 is another feedback control system which includes a supply 725 communicating with a metering system 726 over a feed line 727. The secondary reactant metering system 726 may be of the same type as the principal reactant metering system 716. An output 728 of the secondary reactant metering system 726 is connected to a flow rate transducer 729 which produces a signal corresponding to the rate of flow of the secondary reactant. An output 731 of the transducer 729 is connected to the secondary reactant inlet 221. A signal output 722 of the reaction zone pressure sensor 654 and a signal output 730 of the secondary reactant flow rate transducer 729 are connected to separate signal inputs of the secondary reactant metering system 726, and an output of the computer system 723 is connected to a third input. The secondary liquid reactant flow rate regulation system 724 may be operated in a mode analagous to that described above for the principal liquid reactant regulation system 714.

In an inert fluid flow rate regulation system 734, an output of the inert fluid supply 640 is connected to the needle valve 643, which, in turn, is connected to the on/off valve 642. Valve 642 is connected to an inert fluid flow rate transducer 735. A signal output 736 of the transducer 735 is connected to a first input of an inert fluid needle valve controller 737. A second input of the needle valve controller 737 is connected to the computer system 723 and a third input is connected to the plenum pressure sensor 646. The opening of the needle valve 648 may be set by the controller 737. An inert fluid output of transducer 735 is connected to the pressure vessel inlets 408 and 409 of the reactor. For convenience, the plenum exhaust valve 647, flow meter 644 and inert fluid mixing manifold 535, of FIG. 10 are not shown in FIG. 13, and the inert fluid flow rate transducer 735 of FIG. 13 is not shown in FIG. 10.

In operation, the on/off valve 642 is opened, allowing the inert fluid to flow through transducer 735 and into the inlets 408 and 409. The needle valve controller 737 compares a flow-rate signal from the transducer 735, to a flow rate specified by the computer system 723 and adjusts needle valve 643 accordingly, provided, however, that the plenum pressure as sensed by pressure senso 646 does not exceed an upper limit also specified the by computer system 723. If the pressure is excessive, the needle valve controller 737 reduces the flow rate to lower the pressure.

A reactor temperature control system 700, shown in detail in FIG. 11 and depicted schematically in FIG. 13, comprises a reactor temperature controller 738 which includes the power controller 704, firing circuit 706, set point controller 707, converter 709, recorder 710, and meters 750 and 751 shown in FIG. 11. The radiometer 708 (not shown in FIG. 13) is housed within the viewport 441 and connected to the controller 738. The three-phase power line 702 connects the heater power output 703 of the reactor temperature controller 738 to the heating elements 302 (not shown in FIG. 13) through the electrodes 309. Thus, the level of electrical power supplied at the heater power output 703 determines the temperature of the reactor tube 401. The control signal input 711 and an output of the reactor temperature controller 738 are connected to the computer system 723 by the inut signal line 713 and the output signal line 712, respectively.

A reactor product sampler 740, connected to an outlet 741 located adjacent the reactor outlet closure valve 655, transfers at preselected time intervals samples of reaction product into a sample inlet 742 of a gas chromatograph 743. An electrical signal at an output 744 of the chromatograph 743 responds to changes in the chemical composition of the samples. For example, the gas chromatograph 743 in conjunction with the reaction product sampler 740 may produce a signal which corresponds to the concentration of ethylene in a process for the partial pyrolysis of a hydrocarbon.

Outputs of the gas chromatograph 743 are connected to a recorder 749 and the computer system 723. An input 745 of the computer system 723 is connected to transducers for the process variables by a data bus 746, which includes signal lines connected to the flow rate transducers 719, 729 and 735, pressure sensors 646 and 654, temperature controller 738, and gas chromatograph 743. Other transducers may be tied to the data bus 746 as desired. An output 747 of the computer system 723 is connected to a command bus 748 which includes signal lines tied to the principal reactant metering system 716, secondary reactant metering system 726, reactor temperature controller 738, and inert fluid needle valve control 737. The computer system 723 may include a digital computer, an analog-to-digital converter for converting analog signals of the transducers to digital data for the computer, a digital-to-analog converter for converting digital signals from the computer to analog control signals, and a multiplexer for switching among signal lines in the data bus 746 and the command bus 748.

It is contemplated that during a process run the computer system 723 may specify and monitor process variables by signals communicated over the command bus 748 and the data bus 746. Thus, the computer system 723 may supervise the operation of the reactor to ensure that process variables remain within specified ranges. Moreover, the computer may be programmed to search for optimum operating conditions for a particular process by making systematic variations in the process variables while monitoring the output of the reactor with the chromatograph 743. For example, the computer may be programmed to search for reactor temperatures and feedstock flow rates which maximize the ethylene concentration in the output for a particular hydrocarbon feedstock. The computer system 723 may also be incorporated in feedback control systems; such as a reaction product control system which includes in addition to the computer system 723 the reaction product sampler 740, the gas chromatograph 743, the reactor temperature controller 738, and the three-phase power line 702 connected to the heating elements 302. In this reaction product control system, the computer system compares the chemical composition of samples of reaction product withdrawn from the reactor to a preselected composition and generates an electrical signal at its output 747 corresponding to deviations in the chemical composition of the samples. The output 747 of the computer system 723 is connected to the input 711 of the reactor temperature controller to enable variation of the temperature of the reactor tube in response to changes in the signal from the computer system, reducing the deviations in the chemical composition of the reaction products. Other process variables such as the feedrates of selected reactants and the pressure in the reaction zone may also be controlled by similar feedback control systems.

UTILIZATION OF THE FLUID-WALL REACTOR

The fluid-wall reactor of the invention may be used in virtually any high temperature chemical reaction, many of which reactions have been previously regarded as either impractical or only theoretically possible. Utilizing this fluid-wall reactor, such high temperature chemical reaction processes can be conducted at temperatures up to about 6000° F. by (1) generating within the interior of the porous reactor tube an annular envelope consituting an inert fluid which is substantially transparent to radiant energy to form a protective blanket for the radially inward surface of the reactor tube, the annular envelope having substantial axial length and the interior of the envelope defining a reaction chamber; (2) passing at least one reactant (which may be either in solid, liquid or gaseous state) through the reaction chamber along a predtermined path substantially coincident with the longitudinal axis of the envelope, the reactants being confined within the reaction chamber; and (3) directing high intensity radiant energy into the reaction chamber to coincide with at least a portion of the predetermined path of the reactants, sufficient radiant energy being absorbed within the reaction chamber to raise the temperature of the reactants to a level required to initiate and sustain the desired chemical reaction.

Among the reactions which may be carried out in the fluid-wall reactor of the invention are the dissociation of hydrocarbons and hydrocarbonaceous materials, such as coal and various petroleum fractions, into hydrogen and carbon black; the steam reforming of coal, petroleum fractions, oil shale, tar sands, lignite, and any carbonaceous or hydrocarbonaceous feedstock into synthesis gas mixtures; the partial dissociation of hydrocarbons and hydrocarbonaceous materials into lower molecular weight compounds; the partial pyrolysis of saturated hydrocarbons into unsaturated hydrocarbons, such as ethylene, propylene and acetylene; the conversion of organic waste materials, such as sewage sludge, into a fuel gas, the complete or partial desulfurization of sulfur-containing hydrocarbonaceous feedstocks; and the reduction of mineral ores with hydrogen, carbon, synthesis gas, or other reducing agent.

I claim:

1. In a high temperature reactor wherein substantially all of the heat is supplied by radiation coupling, comprising
   (a) a reactor tube having an inlet end and an outlet end, the interior of the tube defining a reactor chamber, the reactor tube being made of a porous refractory material capable of emitting sufficient radiant energy to raise the temperature of reactants within the reactor tube to a level required to initiate and sustain the desired chemical reaction, the pores of the refractory material being of such diameter as to permit a uniform flow of sufficient inert fluid which is substantially transparent to radiant energy through the tube wall to constitute a protective blanket for the radially inward surface of the reactor tube;
   (b) a fluid-tight, tubular pressure vessel enclosing the reactor tube to define an inert fluid plenum between the reactor tube and the pressure vessel, the inlet and outlet ends of the reactor tube being sealed from the plenum; the pressure vessel having an inlet for admitting the inert fluid which is directed under pressure into the plenum and through the porous tube wall into the reactor chamber;
   (c) means for introducing at least one reactant into the reactor chamber through the inlet end of the reactor tube, the reactants being directed in a predetermined path axially of the reactor tube and being confined by the protective blanket substantially centrally within the reactor chamber and out of contact with the inner wall of the reactor tube;

(d) electrical means disposed within the plenum and spaced radially outwardly of the reactor tube for heating the reactor tube to the temperature level at which it emits sufficient radiant energy to initiate and sustain the desired chemical reaction, the radiant energy being directed centrally therewithin substantially coincident with at least a portion of the path of the reactants; and (e) a circumferential heat shield disposed within the pressure vessel and radially outwardly of the heating means, the heat shield reflecting radiant energy toward the reactor tube;

the improvement in combination therewith comprising:

(i) a reactor-tube assembly, including
  (i.1) the reactor tube of paragraph (a) of the preamble, the reactor tube being made of a porous fabric of a fibrous, refractory material;
  (i.2) a first support ring having an opening passing therethrough, the first support ring being secured to the inlet end of the reactor tube with the opening of the support ring generally coaxial with the opening in the inlet end of the reactor tube so that the opening of the first support ring communicates with the interior of the reactor tube through the inlet-end opening; and
  (i.3) a second support ring having an opening passing therethrough, the second support ring being secured to the outlet end of the reactor tube with the opening of the support ring generally coaxial with the opening in the outlet end of the reactor tube so that the opening of the second support ring communicates with the interior of the reactor tube through the outlet-end opening; and (ii) means for attaching the first and the second support rings to the pressure vessel to position the reactor tube within the pressure vessel.

2. The high temperature reactor according to claim 1 in which the fibrous fabric of the reactor tube is stiffened to as to be capable of withstanding without collapsing a fluid pressure differential between the radially outward surface and the radially inward surface of the reactor tube resulting from the flow of inert fluid through the tube wall.

3. A fluid-wall reactor according to claim 1, in which the fibrous refractory material is graphite or carbon.

4. A fuid-wall reactor according to claim 1, further including means for applying an axial tensile force to the reactor tube.

5. A fluid-wall reactor according to claim 1, further including means for cooling the pressure vessel.

6. A fluid-wall reactor according to claim 1, in which a portion of the interior of the reaction tube between the inlet end of the tube and the reaction zone defines a prereaction zone into which the inert fluid is directed to form a protective blanket which assists in confining the reactants substantially centrally within the reaction zone and out of contact with the inner wall of the reactor tube.

7. A fluid-wall according to claim 1, in which means for introducing a solid reactant into the reaction zone of the reactor tube includes a helical feed screw rotatably mounted within an elongated tubular housing, drive means for rotating the feed screw, a hopper for introducing a crushed, solid reactant into the housing, means for introducing a pressure sealing fluid into the housing at a point downstream from the hopper, and outlet means for discharging the reactant and the sealing fluid from the housing into the reactor inlet.

8. A fluid-wall reactor according to claim 1, in which the heat shield is made of a graphitic material.

9. A fluid-wall reactor according to claim 1, further including reaction product cooling means disposed adjacent to the outlet end of the reactor tube.

10. A fluid-wall reactor according to claim 1 in which the means for attaching the first and the second support rings to the pressure vessel includes a tubular bellows disposed within an inlet assembly section of the pressure vessel, an inlet end of the bellow being secured in a fluid-tight manner to the inlet assembly section and an outlet end of the bellows being secured to the first support ring to form a fluid-tight connection to the inlet end of the reactor tube, the bellows being deformable to accommodate axial expansion and contraction of the reactor tube.

11. A fluid-wall reactor according to claim 1, including means for depositing a refractory coating upon portions of the fibrous refractory material of the reactor tube which are disposed within the black body cavity to increase the rigidity of the fabric.

12. A fluid-wall reactor according to claim 11, in which the refractory coating depositing means includes sensors to determine the pressure differential between the plenum and the reaction zone, metering means for dispensing a refractory deposition agent into the inert gas stream, and reactor tube outlet closure means, the inert gas stream containing the deposition agent being directed into the reaction zone and radially outwardly through the tube wall into the inert fluid plenum.

13. A fluid-wall reactor according to claim 1, further including means for enlarging the diameter of the pores in the fabric to increase the flow of inert fluid through the tube wall.

14. A fluid-wall reactor according to claim 13, in which the means for enlarging the diameter of the pores includes sensors to determine the pressure differential between the plenum and the reaction zone and metering means for dispensing an etching agent into the inert gas stream.

15. A fluid-wall reactor according to claim 1, in which portions of the fibrous refractory material which are heated and exposed to the inert fluid have a coating of a refractory oxide.

16. A fluid-wall reactor according to claim 15, in which the refractory oxide is thorium oxide, magnesium oxide, zinc oxide, aluminum oxide, zirconium oxide or two or more mixtures thereof.

17. A fluid-wall reactor according to claim 1, in which the electrical means includes a plurality of electrically resistive heating elements spaced circumferentially about the tube.

18. A fluid-wall reactor according to claim 17, in which each electrically resistive heating element is made of a fabric of a fibrous refractory material.

19. A fluid-wall reactor according to claim 19, in which the fibrous refractory material is graphite or carbon.

20. A fluid-wall reactor according to claim 1, further including means for reducing the diameter of the pores in the fabric to decrease the flow of inert fluid through the tube wall.

21. A fluid-wall reactor according to claim 20, in which the means for reducing the diameter of the pores includes sensors to determine the pressure differential between the plenum and the reaction zone and metering means for dispensing a refractory deposition agent into the inert gas stream.

22. A fluid-wall reactor according to claim 21, in which the refractory deposition agent is a carbonaceous gas.

23. A fluid-wall reactor according to claim 21, in which the refractory deposition agent is a volatile metal-containing compound.

24. A fluid-wall reactor according to claim 1, further including means for introducing a radiant energy absorptive target into the reactor chamber coincident with at least one point along the path of the reactants which are transparent to radiant energy, sufficient radiant energy being absorbed by the target to raise the temperature of the reactants to a level required to initiate the desired chemical reaction.

25. A fluid-wall reactor according to claim 24, in which the target is a liquid.

26. A fluid-wall reactor according to claim 24, in which the target is a gas which exhibits absorption in the electromagnetic spectrum from about 100 microns to about 0.01 microns.

27. A fluid-wall reactor according to claim 24, in which the target is finely divided carbon powder which is introduced through the inlet end of the reactor tube along a predetermined path coincident with the path of the reactants.

28. A fluid-wall reactor according to claim 1, in which a means for introducing a liquid reactant into the reaction zone of the reactor tube includes a fogging nozzle disposed within the reactor tube adjacent an inlet of the reaction zone, the liquid reactant and an atomizing gas being directed under pressure and mixed within the nozzle, the liquid reactant being dispersed from the nozzle outlet as a fog which absorbs radiant energy.

29. A fluid-wall reactor according to claim 28, in which the fogging nozzle includes a tubular shroud secured to and disposed radially outwardly of the nozzle, the axis of the shroud being substantially parallel to the axis of the reactor tube.

30. A fluid-wall reactor according to claim 28, including a plurality of fogging nozzles disposed within the reactor tube adjacent the inlet end of the reactor zone.

31. A fluid-wall reactor according to claim 28, in which the means for introducing a liquid reactant into the reaction zone further includes means for introducing a sweep gas into the inlet end of the reactor tube, the sweep gas directing the liquid reactant fog towards the reaction zone.

32. In combination with a high temperature reactor wherein substantially all of the heat is supplied by radiation coupling, comprising (1) a reactor tube having an inlet end and an outlet end, the interior of the tube defining a reactor chamber, the reactor tube being made of a porous refractory material capable of emitting sufficient radiant energy to raise the temperature of reactants within the reactor tube to a level required to initiate and sustain the desired chemical reaction; the pores of the refractory material being of such diameter as to permit a uniform flow of sufficient inert fluid which is substantially transparent to radiant energy through the tube wall to constitute a protective blanket for the radially inward surface of the reactor tube;

(2) a fluid-tight, tubular pressure vessel enclosing the reactor tube to define an inert fluid plenum between the reactor tube and the pressure vessel, the inlet and outlet ends of the reactor tube being sealed from the plenum; the pressure vessel having an inlet for admitting the inert fluid which is directed under pressure into the plenum and through the porous tube wall into the reactor chamber;

(3) means for introducing at least one reactant into the reactor chamber through the inlet end of the reactor tube, the reactants being directed in a predetermined path axially of the reactor tube and being confined by the protective blanket substantially centrally within the reactor chamber and out of contact with the inner wall of the reactor tube;

(4) electrical means disposed within the plenum and spaced radially outwardly of the reactor tube for heating the reactor tube to the temperature level at which it emits sufficient radiant energy to initiate and sustain the desired chemical reaction, the radiant energy being directed centrally therewithin substantially coincident with at least a portion of the path of the reactants; and (5) a circumferential heat shield disposed within the pressure vessel and radially outwardly of the heating means, the heat shield reflecting radiant energy toward the reactor tube;

means for enlarging the diameter of the pores in the tube wall to increase the flow of inert fluid through the wall.

33. A fluid-wall reactor according to claim 32, in which the means for enlarging the diameter of the pores includes sensors to determine the pressure differential between the plenum and the reaction zone and metering means for dispensing an etching agent into the inert gas stream.

34. In combination with a high temperature reactor wherein substantially all of the heat is supplied by radiation coupling, comprising (1) a reactor tube having an inlet end and an outlet end, the interior of the tube defining a reactor chamber, the reactor tube being made of a porous refractory material capable of emitting sufficient radiant energy to raise the temperature of reactants within the reactor tube to a level required to initiate and sustain the desired chemical reaction; the pores of the refractory material being of such diameter as to permit a uniform flow of sufficient inert fluid which is substantially transparent to radiant energy through the tube wall to constitute a protective blanket for the radially inward surface of the reactor tube;

(2) a fluid-tight, tubular pressure vessel enclosing the reactor tube to define an inert fluid plenum between the reactor tube and the pressure vessel, the inlet and outlet ends of the reactor tube being sealed from the plenum; the pressure vessel having an inlet for admitting the inert fluid which is directed under pressure into the plenum and through the porous tube wall into the reactor chamber;

(3) means for introducing at least one reactant into the reactor chamber through the inlet end of the reactor tube, the reactants being directed in a predetermined path axially of the reactor tube and being confined by the protective blanket substantially centrally within the reactor chamber and out of contact with the inner wall of the reactor tube;

(4) electrical means disposed within the plenum and spaced radially outwardly of the reactor tube for heating the reactor tube to the temperature level at which it emits sufficient radiant energy to initiate and sustain the desired chemical reaction, the radiant energy being directed centrally therewithin substantially coincident with at least a portion of the path of the reactants; and (5) a circumferential heat shield disposed within the pressure vessel and radially outwardly of the heating means, the heat shield reflecting radiant energy toward the reactor tube;

means for reducing the diameter of the pores in the tube wall to decrease the flow of inert fluid through the wall.

35. A fluid-wall reactor according to claim 34, in which the means for reducing the diameter of the pores includes sensors to determine the pressure differential between the plenum and the reaction zone and metering means for dispensing a refractory deposition agent into the inert gas stream.

36. a fluid-wall reactor according to claim 35, in which the refractory deposition agent is a carbonaceous gas.

37. A fluid-wall reactor according to claim 35, in which the refractory deposition agent is a volatile metal-containing compound.

* * * * *

UNITED STATES PATENT AND TRADEMARK OFFICE
CERTIFICATE OF CORRECTION

PATENT NO. : 4,199,545
DATED : April 22, 1980
INVENTOR(S) : Edwin Matovich

It is certified that error appears in the above-identified patent and that said Letters Patent are hereby corrected as shown below:

ABSTRACT - Column 2, line 25, "as the" should read -- are the --.

Column 3, line 38, "the sustain" should read -- and sustain --.

Column 4, line 47, "these" should read -- those --.

Column 5, line 44, "FIG. 1B; ;p" should read -- FIG. 1B; [paragraph]FIG. 4 --.

Column 8, line 15 "(a)" should read -- (α) --.

Column 8, line 46, "ELECTRODE ASSEMBLY" should read -- B. ELECTRODE ASSEMBLY --.

Column 8, line 48, "310" should read -- 301 --.

Column 8, line 51, "310" should read -- 301 --.

Column 9, line 58, "accomodate" should read -- accommodate --.

Column 13, line 47, "As best shown" should read -- As shown best.

Column 17, line 51, "feet" should read -- feed --.

UNITED STATES PATENT AND TRADEMARK OFFICE
CERTIFICATE OF CORRECTION

PATENT NO. : 4,199,545　　　　　　　　　　Page 2 of 2
DATED : April 22, 1980
INVENTOR(S) : Edwin Matovich It is certified that error appears in the above-identified patent and that said Letters Patent are hereby corrected as shown below:

Column 17, line 57, "of approach" should read -- to approach --.

Column 18, line 39, "senso 646" should read -- sensor 646 --.

Column 18, line 40, "the by computer" should read -- by the computer --.

Column 18, line 59, "inut signal" should read -- input signal --.

Column 19, line 17, "valve control 737" should read -- valve controller 737 --.

Column 22, line 14, "bellow being" should read -- bellows being --.

Column 22, line 60, "according to claim 19" should read -- according to claim 18 --.

Signed and Sealed this

*Fourteenth* Day of *October 1980*

[SEAL]

*Attest:*

SIDNEY A. DIAMOND

*Attesting Officer*　　　*Commissioner of Patents and Trademarks*